US011862073B2

(12) United States Patent
Yoon et al.

(10) Patent No.: US 11,862,073 B2
(45) Date of Patent: Jan. 2, 2024

(54) DISPLAY DEVICE AND DRIVING METHOD THEREOF

(71) Applicant: Samsung Display Co., Ltd., Yongin-si (KR)

(72) Inventors: Changnoh Yoon, Seoul (KR); Sangan Kwon, Cheonan-si (KR); Soon-Dong Kim, Osan-si (KR); Taehoon Kim, Hwaseong-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 17/973,983

(22) Filed: Oct. 26, 2022

(65) Prior Publication Data

US 2023/0260449 A1 Aug. 17, 2023

(30) Foreign Application Priority Data

Jan. 28, 2022 (KR) ........................ 10-2022-0013029

(51) Int. Cl.
*G09G 3/32* (2016.01)

(52) U.S. Cl.
CPC ....... *G09G 3/32* (2013.01); *G09G 2310/0278* (2013.01); *G09G 2320/0247* (2013.01); *G09G 2330/021* (2013.01)

(58) Field of Classification Search
CPC ............. G09G 3/32; G09G 2310/0278; G09G 2320/0247; G09G 2330/021
See application file for complete search history.

(56) References Cited

U.S. PATENT DOCUMENTS

| | | | | |
|---|---|---|---|---|
| 9,633,608 | B2 | 4/2017 | Shin | |
| 11,158,261 | B2 | 10/2021 | Kim et al. | |
| 2011/0057871 | A1* | 3/2011 | Miyashita | G09G 3/344 345/107 |
| 2013/0215360 | A1* | 8/2013 | Pollack | G09G 3/3426 349/61 |
| 2019/0197979 | A1* | 6/2019 | Kim | G09G 3/3275 |
| 2021/0390898 | A1* | 12/2021 | Roh | G09G 3/3233 |

FOREIGN PATENT DOCUMENTS

| | | | |
|---|---|---|---|
| KR | 1020210019639 | A | 2/2021 |
| KR | 102237438 | B1 | 4/2021 |

* cited by examiner

*Primary Examiner* — Andrew Sasinowski
(74) *Attorney, Agent, or Firm* — CANTOR COLBURN LLP

(57) ABSTRACT

A display device includes a driving controller which outputs the output image signal corresponding to the input image signal when the first display area is driven, outputs the output image signal corresponding to a first bias signal when the boundary area is driven, and outputs the output image signal corresponding to a second bias signal different from the first bias signal when the non-boundary area is driven.

20 Claims, 21 Drawing Sheets

| Line # | V |
|---|---|
| L1 | Vdata |
| ⋮ | ⋮ |
| Lk | Vdata |
| Lk+1 | Vp+Vo1 |
| Lk+2 | Vp+Vo2 |
| Lk+3 | Vp+Vo3 |
| Lk+4 | Vp+Vo4 |
| Lk+5 | Vp+Vo5 |
| Lk+6 | Vp+Vo6 |
| Lk+7 | Vp+Vo7 |
| Lk+8 | Vp+Vo8 |
| Lk+9 | Vp+Vo9 |
| Lk+10 | Vp+Vo10 |
| Lk+11 | Vp+Vo11 |
| Lk+12 | Vp+Vo12 |
| Lk+13 | Vp+Vo13 |
| Lk+14 | Vp+Vo14 |
| Lk+15 | Vp+Vo15 |
| Lk+16 | Vp+Vo16 |
| Lk+17 | Vbias2 |
| ⋮ | ⋮ |
| Ln | Vbias2 |

BR (Lk+1 to Lk+17)

Vbias1 : Vp+Vo1 ~ Vp+Vo16

DISPLAY DEVICE AND DRIVING METHOD THEREOF

This application claims priority to Korean Patent Application No. 10-2022-0013029, filed on Jan. 28, 2022, and all the benefits accruing therefrom under 35 U.S.C. § 119, the content of which in its entirety is herein incorporated by reference.

BACKGROUND

1. Field

Embodiments of the disclosure described herein relate to a display device.

2. Description of the Related Art

An electronic device, which provides an image to a user, such as a smartphone, a digital camera, a notebook computer, a navigation system, a monitor, or a smart television, includes a display device for displaying an image. The display device generates an image and provides the user with the generated image through a display screen.

The display device may include a plurality of pixels and a plurality of driving circuits for controlling the plurality of pixels. Each of the plurality of pixels may include a light emitting device and a pixel circuit for controlling the light emitting device. The pixel circuit may include a plurality of transistors connected with each other.

The display device may apply a data signal to a display panel and may display an image as a current corresponding to the data signal is supplied to the light emitting device.

A given image may be displayed by adjusting the amount of current that is supplied to the light emitting device. The pixel circuit may receive driving voltages for the purpose of providing a current to the light emitting device.

As the display device is used in various fields, nowadays, a plurality of different images may be displayed in one display device.

SUMMARY

Embodiments of the disclosure provide a display device capable of reducing power consumption and preventing a display quality from being degraded, and a driving method thereof According to an embodiment, a display device includes a display panel that includes first pixels disposed in a first display area and second pixels disposed in a second display area, a driving controller which receives an input image signal and outputs an output image signal, and a data driving circuit which provides a data signal to each of the first pixels and the second pixels in response to the output image signal. In such an embodiment, the second display area includes a boundary area adjacent to the first display area and a non-boundary area adjacent to the boundary area, and the driving controller outputs the output image signal corresponding to the input image signal when the first display area is driven, the driving controller outputs the output image signal corresponding to a first bias signal when the boundary area is driven, and the driving controller outputs the output image signal corresponding to a second bias signal different from the first bias signal when the non-boundary area is driven.

In an embodiment, the boundary area may include H horizontal lines from a first horizontal line to an H-the horizontal line sequentially arranged from a location adjacent to the first display area, where H is a natural number, and the driving controller may output the first bias signal having a voltage level which varies from the first horizontal line to the H-th horizontal line.

In an embodiment, the voltage level of the first bias signal may stepwise increase from the first horizontal line to the H-th horizontal line.

In an embodiment, a voltage level of the first bias signal may be higher than a reference voltage and may be lower than a voltage level of the second bias signal.

In an embodiment, in a first frame belonging to a non-driving period of a multi-frequency mode, the first bias signal may have a first voltage level. In such an embodiment, in a second frame belonging to the non-driving period, the first bias signal may have a second voltage level different from the first voltage level.

In an embodiment, the first voltage level and the second voltage level may be higher than a reference voltage and may be lower than a voltage level of the second bias signal.

In an embodiment, the display device may further include a scan driving circuit which drives first scan lines and second scan lines, and each of the first pixels and the second pixels may be connected with a corresponding one of the first scan lines and a corresponding one of the second scan lines.

In an embodiment, in a multi-frequency mode, the driving controller may control the data driving circuit and the scan driving circuit in a way such that the first pixels are driven at a first driving frequency and the second pixels are driven at a second driving frequency lower than the first driving frequency.

In an embodiment, during a non-driving period of the multi-frequency mode, some first scan lines connected with the second pixels from among the first scan lines may receive scan signals having a disable level, respectively.

In an embodiment, the driving controller may include an operating mode determiner which determines an operating mode based on the input image signal and a control signal and outputs a mode signal, and a signal generator which outputs the output image signal corresponding to one of the input image signal, the first bias signal, and the second bias signal in response to the input image signal, the control signal, and the mode signal.

According to an embodiment, a display device includes a display panel which includes first pixels disposed in a first display area and second pixels disposed in a second display area, a driving controller which receives an input image signal and outputs an output image signal, and a data driving circuit which provides a data signal to each of the first pixels and the second pixels in response to the output image signal. In such an embodiment, the second display area includes a boundary area adjacent to the first display area and a non-boundary area adjacent to the boundary area. In such an embodiment, in a multi-frequency mode, a second pixel belonging to the boundary area from among the second pixels receives the data signal corresponding to a first bias signal during a non-driving period of the second display area. In such an embodiment, a second pixel belonging to the non-boundary area from among the second pixels receives the data signal corresponding to a second bias signal different from the first bias signal during the non-driving period.

In an embodiment, the boundary area may include H horizontal lines from a first horizontal line to an H-th horizontal line sequentially arranged from a location adjacent to the first display area, where H is a natural number, and a voltage level of the data signal may vary from a second pixel disposed at the first horizontal line from among the second pixel to a second pixel disposed at the H-th horizontal line from among the second pixels.

In an embodiment, a voltage level of the data signal corresponding to the first bias signal may be higher than a reference voltage and may be lower than a voltage level of the data signal corresponding to the second bias signal.

In an embodiment, in a first frame belonging to the non-driving period of the multi-frequency mode, the data signal corresponding to the first bias signal may have a first voltage level. In such an embodiment, in a second frame belonging to the non-driving period, the data signal corresponding to the first bias signal may have a second voltage level different from the first voltage level.

In an embodiment, the first voltage level and the second voltage level may be higher than a reference voltage and may be lower than a voltage level of the data signal corresponding to the second bias signal.

In an embodiment, the display device may further include a scan driving circuit that drives first scan lines and second scan lines, and each of the first pixels and the second pixels may be connected with a corresponding one of the first scan lines and a corresponding one of the second scan lines.

In an embodiment, in the multi-frequency mode, the driving controller may control the data driving circuit and the scan driving circuit in a way such that the first pixels are driven at a first driving frequency and the second pixels are driven at a second driving frequency lower than the first driving frequency.

In an embodiment, during the non-driving period of the multi-frequency mode, some first scan lines connected with the second pixels from among the first scan lines may receive scan signals having a disable level, respectively.

According to an embodiment a driving method of a display device includes dividing a display panel into a first display area and a second display area in a multi-frequency mode in a way such that the first display area is driven at a first driving frequency and the second display area is driven at a second driving frequency, outputting an output image signal corresponding to an input image signal when the first display area is driven, outputting the output image signal corresponding to a first bias signal when a boundary area of the second display area, which is adjacent to the first display area, is driven, and outputting the output image signal corresponding to a second bias signal different from the first bias signal when a non-boundary area of the second display area, which is adjacent to the boundary area, is driven.

In an embodiment, the boundary area includes H horizontal lines from a first horizontal line to an H-th horizontal line sequentially arranged from a location adjacent to the first display area, where H is a natural number, and the outputting of the output image signal corresponding to the first bias signal includes outputting the first bias signal whose having a level which varies when the first horizontal line to the H-th horizontal line are sequentially driven.

BRIEF DESCRIPTION OF THE DRAWINGS

The above and other features of the disclosure will become apparent by describing in detail embodiments thereof with reference to the accompanying drawings.

DETAILED DESCRIPTION

Figure 1:
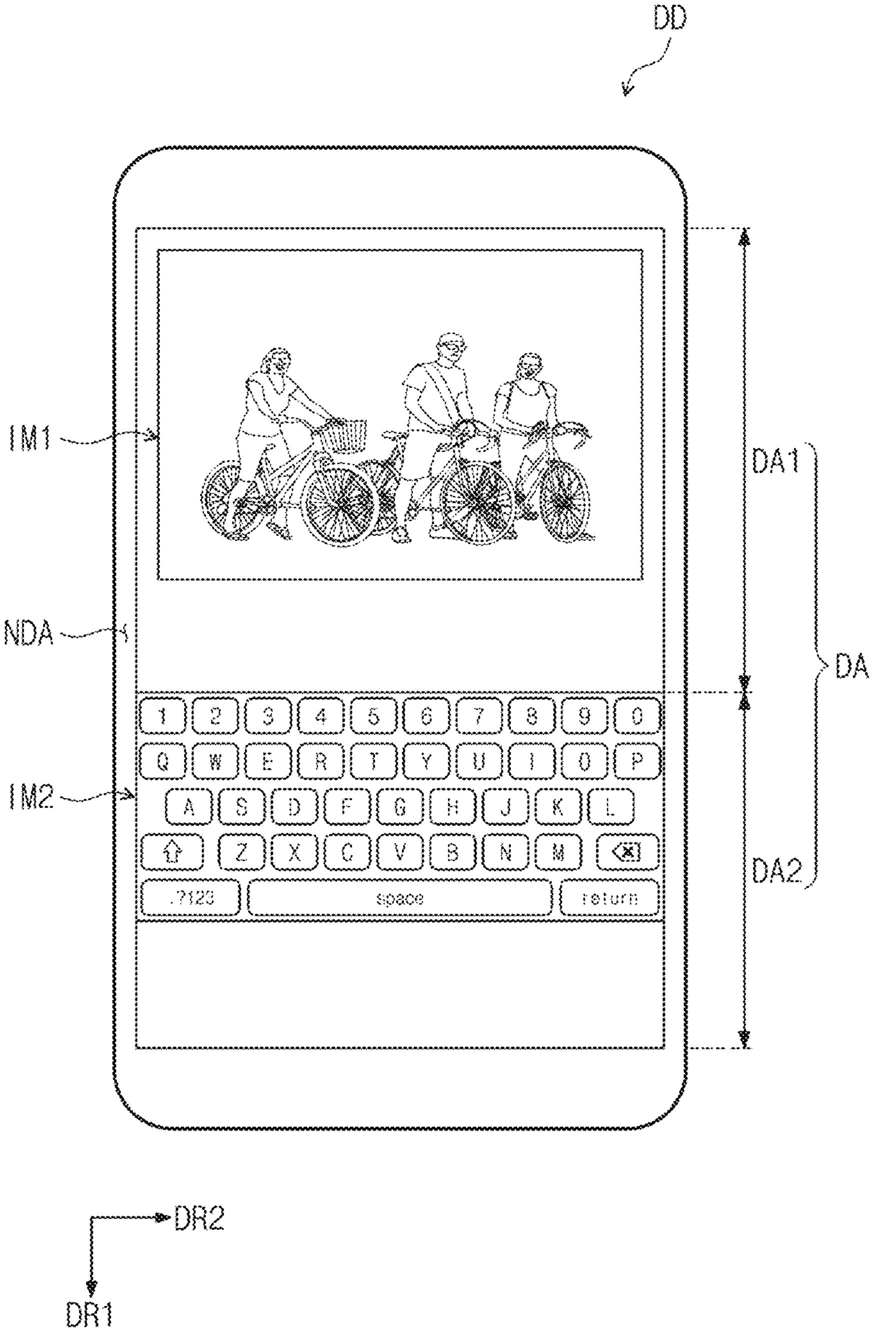
FIG. 1 is a perspective view of a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the specification, the expression that a first component (or region, layer, part, etc.) is "on", "connected with", or "coupled with" a second component means that the first component is directly on, connected directly with, or coupled directly with the second component or means that a third component is interposed therebetween.

The same reference numeral refers to the same component. In addition, in drawings, thicknesses, proportions, and dimensions of components may be exaggerated to describe the technical features effectively.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

The terms "first", "second", etc. are used to describe various components, but the components are not limited by the terms. The terms are only used to distinguish one component from another component. For example, without departing from the scope and spirit of the present disclosure, a first component may be referred to as a "second component", and similarly, the second component may be referred to as the "first component".

Also, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the disclosure will be described in detail with reference to the accompanying drawings.

FIG. 1 is a perspective view of a display device according to an embodiment of the disclosure.

Referring to FIG. 1, an embodiment of a display device DD may be a portable terminal. The portable terminal may include a tablet personal computer (PC), a smartphone, a personal digital assistant (PDA), a portable multimedia player (PMP), a game console, a wristwatch-type electronic device, and the like. However, the disclosure is not limited thereto. Embodiments of the disclosure may be used for small and medium-sized electronic devices such as a personal computer, a notebook computer, a kiosk, an automotive navigation unit, and a camera, in addition to large-sized electronic equipment such as a television or an outside billboard. The above examples are provided only as an embodiment, and it is obvious that the display device DD may be applied to any other electronic device(s) without departing from the concept of the disclosure.

In an embodiment, as illustrated in FIG. 1, a display surface on which a first image IM1 and a second image IM2 are displayed is parallel to a plane defined by a first direction DR1 and a second direction DR2. The display device DD includes a plurality of areas that are distinguished from each other on the display surface. The display surface includes a display area DA in which the first image IM1 and the second image IM2 are displayed, and a non-display area NDA adjacent to the display area DA. The non-display area NDA may be referred to as a bezel area. In an embodiment, for example, the display area DA may be in the shape of a quadrangle. The non-display area NDA surrounds the display area DA. In an embodiment, for example, the display device DD may have a partially curved shape. In such an embodiment, a portion of the display area DA may have a curved shape.

The display area DA of the display device DD includes a first display area DA1 and a second display area DA2. In a specific application program, the first image IM1 may be displayed in the first display area DA1, and the second image IM2 may be displayed in the second display area DA2. In an embodiment, for example, the first image IM1 may be a video, and the second image IM2 may be a still image or an image (e.g., a game control keypad or text information) having a long change period.

The display device DD according to an embodiment may drive the first display area DA1, in which the video is displayed, at a frequency higher than or equal to the normal frequency and may drive the second display area DA2, in which the still image is displayed, at a frequency lower than the normal frequency. The display device DD may reduce power consumption by lowering a driving frequency of the second display area DA2.

Each of the first display area DA1 and the second display area DA2 may have a given size and may be changed by an application program. In an embodiment, when the still image is displayed in the first display area DA1 and the video is displayed in the second display area DA2, the first display area DA1 may be driven at a frequency lower than the normal frequency, and the second display area DA2 may be driven at a frequency higher than or equal to the normal frequency. In an embodiment, the display area DA may be divided into three or more display areas. A driving frequency of each of the three or more display areas may be determined depending on a type (e.g., a still image or a video) of an image that is displayed therein.

Figure 2A:
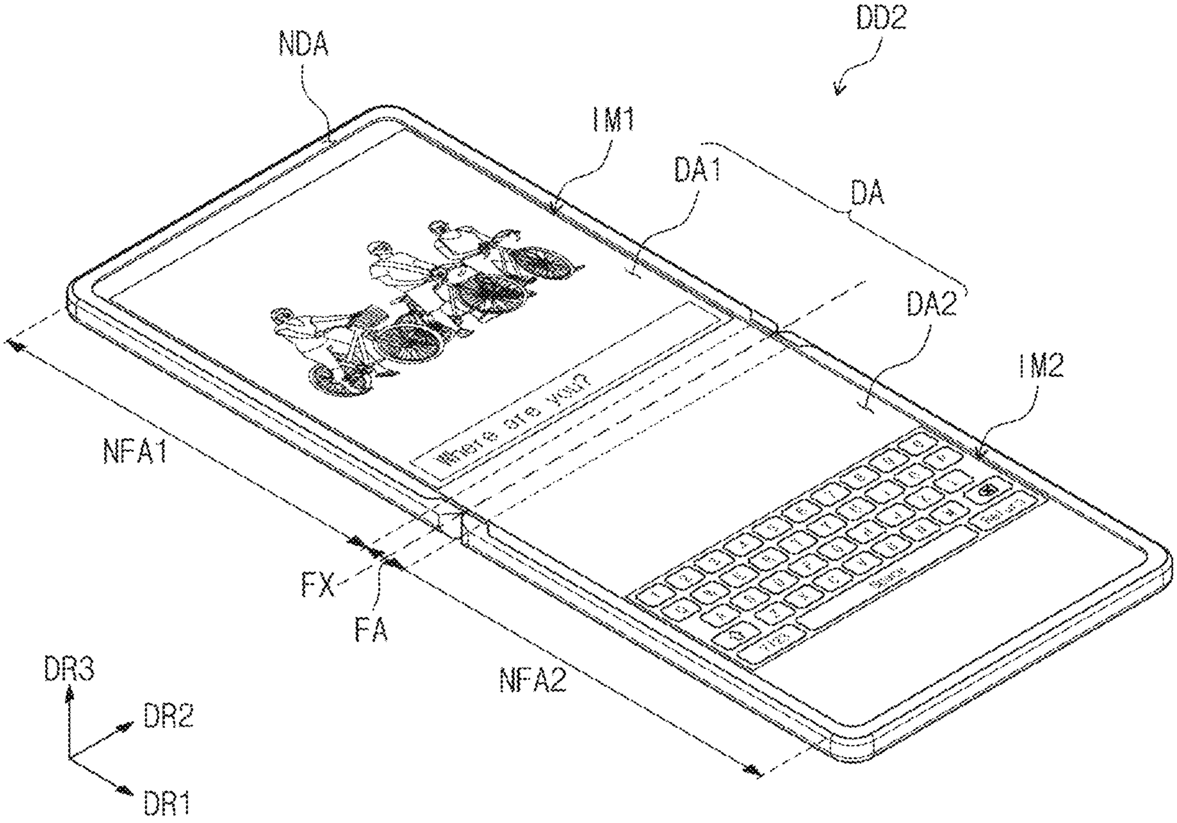
FIGS. 2A and 2B are perspective views of a display device according to an embodiment of the disclosure.
Figure 2B:
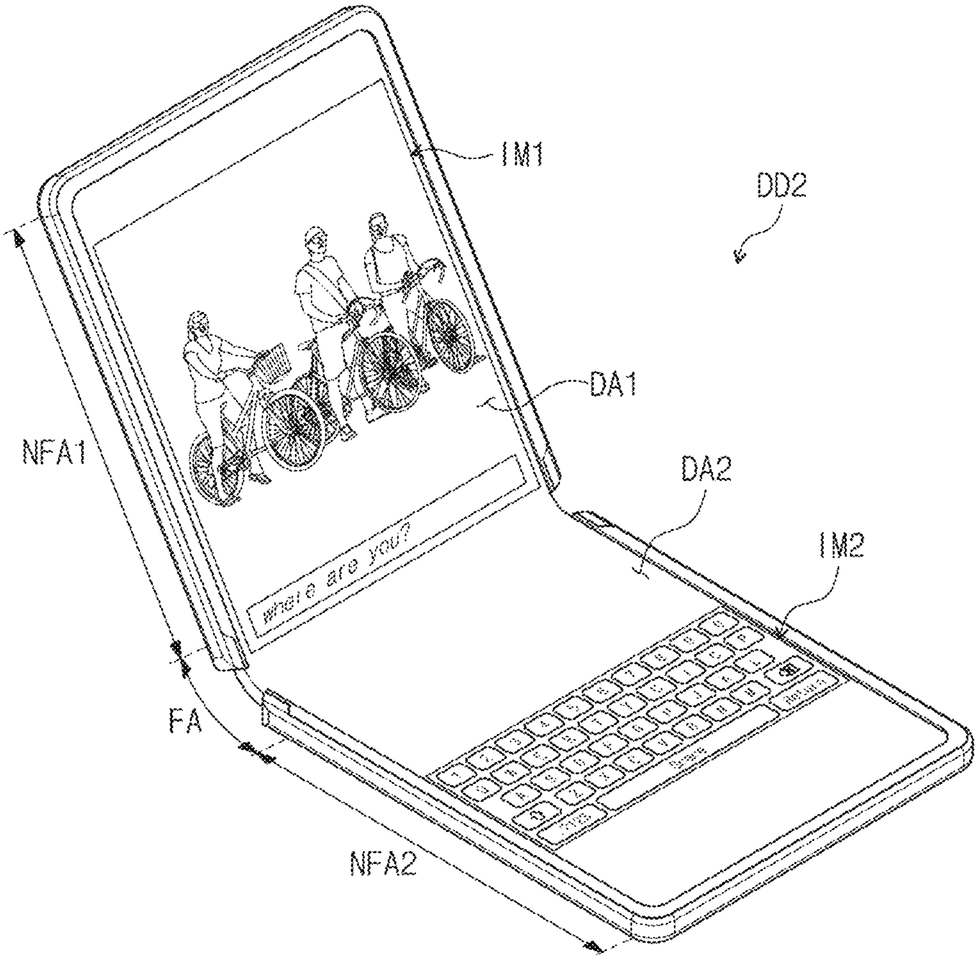

FIGS. 2A and 2B are perspective views of a display device DD2 according to an embodiment of the disclosure. FIG. 2A shows the display device DD2 in an unfolded state, and FIG. 2B shows the display device DD2 in a folded state.

In an embodiment, as illustrated in FIGS. 2A and 2B, the display device DD2 includes the display area DA and the non-display area NDA. The display device DD2 may display an image through the display area DA. The display area DA may include a plane defined by the first direction DR1 and the second direction DR2, in a state where the display device DD2 is unfolded. A thickness direction of the display device DD2 may be parallel to a third direction DR3 intersecting the first direction DR1 and the second direction DR2. Accordingly, front surfaces (or upper surfaces) and bottom surfaces (or lower surfaces) of members constituting the display device DD2 may be defined with respect to the third direction DR3. In an embodiment, for example, the display area DA may be in the shape of a quadrangle. The non-display area NDA surrounds the display area DA.

The display area DA may include a first non-folding area NFA1, a folding area FA, and a second non-folding area NFA2. The folding area FA may be bent about a folding axis FX extending in the second direction DR2.

When the display device DD2 is folded, the first non-folding area NFA1 and the second non-folding area NFA2 may face each other. Accordingly, in a state where the display device DD2 is fully folded, the display area DA may not be exposed to the outside, which may be referred to as "in-folding". This is only an example, and the operation of the display device DD2 is not limited thereto.

In an embodiment of the disclosure, when the display device DD2 is folded, the first non-folding area NFA1 and the second non-folding area NFA2 may be opposite to each other. Accordingly, in a state where the display device DD2 is folded, the first non-folding area NFA1 may be exposed to the outside, which may be referred to as "out-folding".

In an embodiment, the display device DD2 may be configured to operate only one of the in-folding and the out-folding. Alternatively, the display device DD2 may be configured to operate both the in-folding and the out-folding. In such an embodiment, the same area of the display device DD2, for example, the folding area FA, may be in-folded or out-folded (or may be folded inwardly and outwardly). Alternatively, a partial area of the display device DD2 may be in-folded, and another partial area thereof may be out-folded.

In an embodiment, the display device DD2 may include a single folding area and two non-folding areas as illustrated in FIGS. 2A and 2B, but the number of folding areas and the number of non-folding areas are not limited thereto. In an alternative embodiment, for example, the display device DD2 may include a plurality of non-folding areas, the number of which is more than two, and a plurality of folding areas, and each of the plurality of folding areas may be interposed between non-folding areas adjacent to each other from among the plurality of non-folding areas.

An embodiment in which the folding axis FX is parallel to a short side (or parallel to the minor axis) of the display device DD2 is illustrated in FIGS. 2A and 2B. However, the disclosure is not limited thereto. In an alternative embodiment, for example, the folding axis FX may extend in a direction parallel to a long side (or the major axis) of the display device DD2, for example, the first direction DR1.

An embodiment in which the first non-folding area NFA1, the folding area FA, and the second non-folding area NFA2 are sequentially arranged in the first direction DR1 is illustrated in FIGS. 2A and 2B. However, the disclosure is not limited thereto. In an alternative embodiment, for example, the first non-folding area NFA1, the folding area FA, and the second non-folding area NFA2 may be sequentially arranged in the second direction DR2.

The plurality of display areas DA1 and DA2 may be defined in the display area DA of the display device DD2. An embodiment where the plurality of display areas includes two display areas DA1 and DA2 is illustrated in FIG. 2A, but the number of display areas DA1 and DA2 is not limited thereto. The plurality of display areas DA1 and DA2 may include the first display area DA1 and the second display area DA2. In an embodiment, for example, the first display area DA1 may refer to an area where the first image IM1 is displayed, and the second display area DA2 may refer to an area in which the second image IM2 is displayed. In an embodiment, for example, the first image IM1 may be a video, and the second image IM2 may be a still image or an image (e.g., text information) having a long change period.

The display device DD2 according to an embodiment may operate differently depending on an operating mode. The operating mode may include a normal frequency mode and a multi-frequency mode. In the normal frequency mode, the display device DD2 may drive both the first display area DA1 and the second display area DA2 at a normal frequency. In the multi-frequency mode, the display device DD2 according to an embodiment may drive the first display area DA1, in which the first image IM1 is displayed, at a first driving frequency and may drive the second display area DA2, in which the second image IM2 is displayed, at a second driving frequency lower than the normal frequency. In such an embodiment, the first driving frequency may be higher than or equal to the normal frequency.

Each of the first display area DA1 and the second display area DA2 may have a given size and may be changed by an application program. In an embodiment, the first display area DA1 may correspond to the first non-folding area NFA1, and the second display area DA2 may correspond to the second non-folding area NFA2. In addition, a first portion of the folding area FA may correspond to the first display area DA1, and a second portion of the folding area FA may correspond to the second display area DA2.

In an embodiment, the whole folding area FA may correspond to only one of the first display area DA1 and the second display area DA2.

In an embodiment, the first display area DA1 may correspond to the first portion of the first non-folding area NFA1, and the second display area DA2 may correspond to the second portion of the first non-folding area NFA1, the folding area FA, and the second non-folding area NFA2. In such an embodiment, the size of the second display area DA2 may be larger than the size of the first display area DA1.

In an embodiment, the first display area DA1 may correspond to the first non-folding area NFA1, the folding area FA, and the first portion of the second non-folding area NFA2, and the second display area DA2 may be the second portion of the second non-folding area NFA2. In such an embodiment, the size of the first display area DA1 may be larger than the size of the second display area DA2.

As illustrated in FIG. 2B, in a state where the folding area FA is folded, the first display area DA1 may correspond to the first non-folding area NFA1, and the second display area DA2 may correspond to the folding area FA and the second non-folding area NFA2.

FIGS. 2A and 2B illustrates an embodiment where the display device DD2 has a single folding area. However, the disclosure is not limited thereto. In an alternative embodiment, for example, the disclosure may also be applied to a display device having two or more folding areas, a rollable display device, or a slidable display device.

Hereinafter, embodiments of the display device DD illustrated in FIG. 1 will be described in detail. However, features of embodiments of the display device DD illustrated in FIG. 1 described herein may be identically applied to other alternative embodiments, e.g., the display device DD2 illustrated in FIGS. 2A and 2B.

Figure 3A:
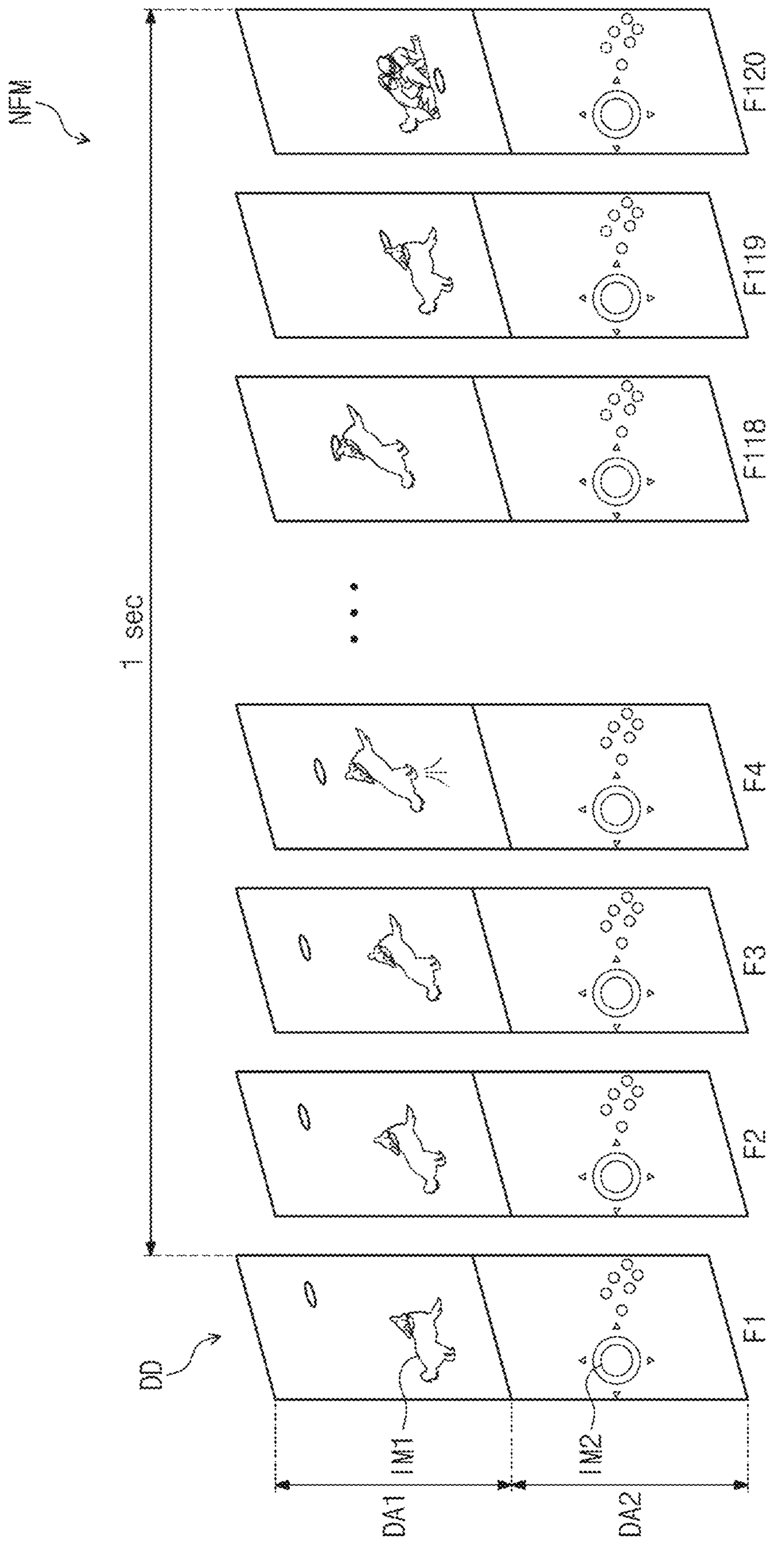
FIG. 3A is a diagram for describing an operation of a display device in a normal frequency mode.
Figure 3B:
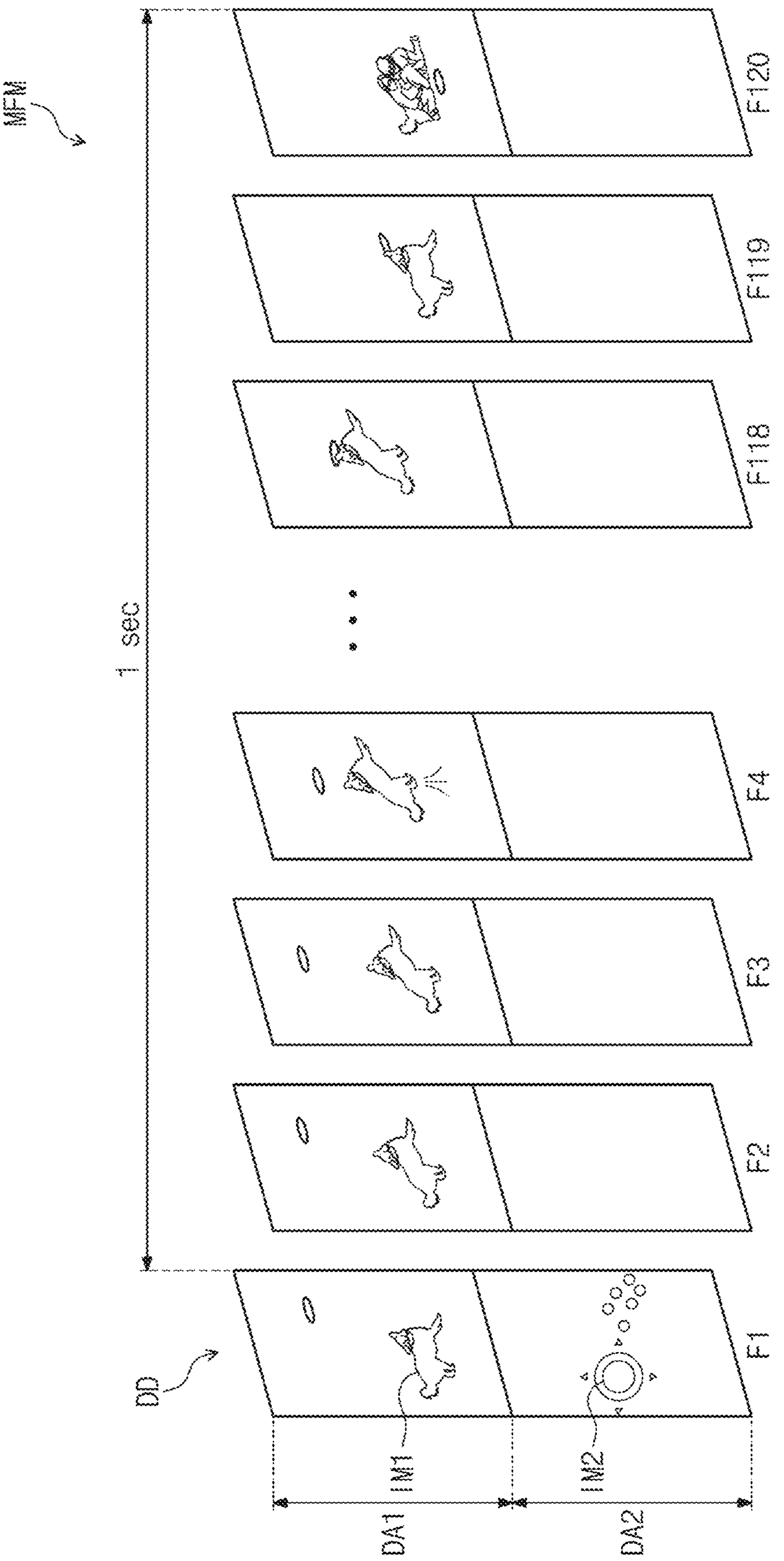
FIG. 3B is a diagram for describing an operation of a display device in a multi-frequency mode.

FIG. 3A is a diagram for describing an operation of a display device in a normal frequency mode. FIG. 3B is a diagram for describing an operation of a display device in a multi-frequency mode.

Referring to FIG. 3A, the first image IM1 that is displayed in the first display area DA1 may be a video, and the second image IM2 that is displayed in the second display area DA2 may be a still image or an image (e.g., a game control keypad) having a long change period. The first image IM1 displayed in the first display area DA1 and the second image IM2 displayed in the second display area DA2 illustrated in FIG. 1 are an example, and various images may be displayed on the display device DD.

In a normal frequency mode NFM, driving frequencies of the first display area DA1 and the second display area DA2 of the display device DD correspond to a normal frequency. In an embodiment, for example, the normal frequency may be 120 hertz (Hz). In the normal frequency mode NFM, images each including first to 120th frames F1 to F120 may be displayed in the first display area DA1 and the second display area DA2 of the display device DD for 1 second.

Referring to FIG. 3B, in a multi-frequency mode MFM, the display device DD may set a driving frequency of the first display area DA1, in which the first image IM1 (i.e., a video) is displayed, to the first driving frequency, and may set a driving frequency of the second display area DA2, in which the second image IM2 (i.e., a still image) is displayed, to a second driving frequency lower than the first driving frequency. When the normal frequency is 120 Hz, the first driving frequency may be 120 Hz, and the second driving frequency may be 1 Hz. The first driving frequency and the second driving frequency may be variously changed. In an embodiment, for example, the first driving frequency may be 120 Hz, which is the same frequency as the normal frequency, or may be 144 Hz higher than the normal frequency, and the second driving frequency may be one selected from 60 Hz, 30 Hz, Hz, 10 Hz, and 1 Hz lower than the normal frequency.

In the multi-frequency mode MFM, when the first driving frequency is 120 Hz and the second driving frequency is 1 Hz, the first image IM1 corresponding to each of the first to 120th frames F1 to F120 may be displayed in the first display area DA1 of the display device DD for 1 second. With regard to only the first frame F1, the second image IM2 may be displayed in the second display area DA2; with regard to the remaining frames F2 to F120, an image may not be displayed. An operation of the display device DD in the multi-frequency mode MFM will be described in detail later.

Figure 4:
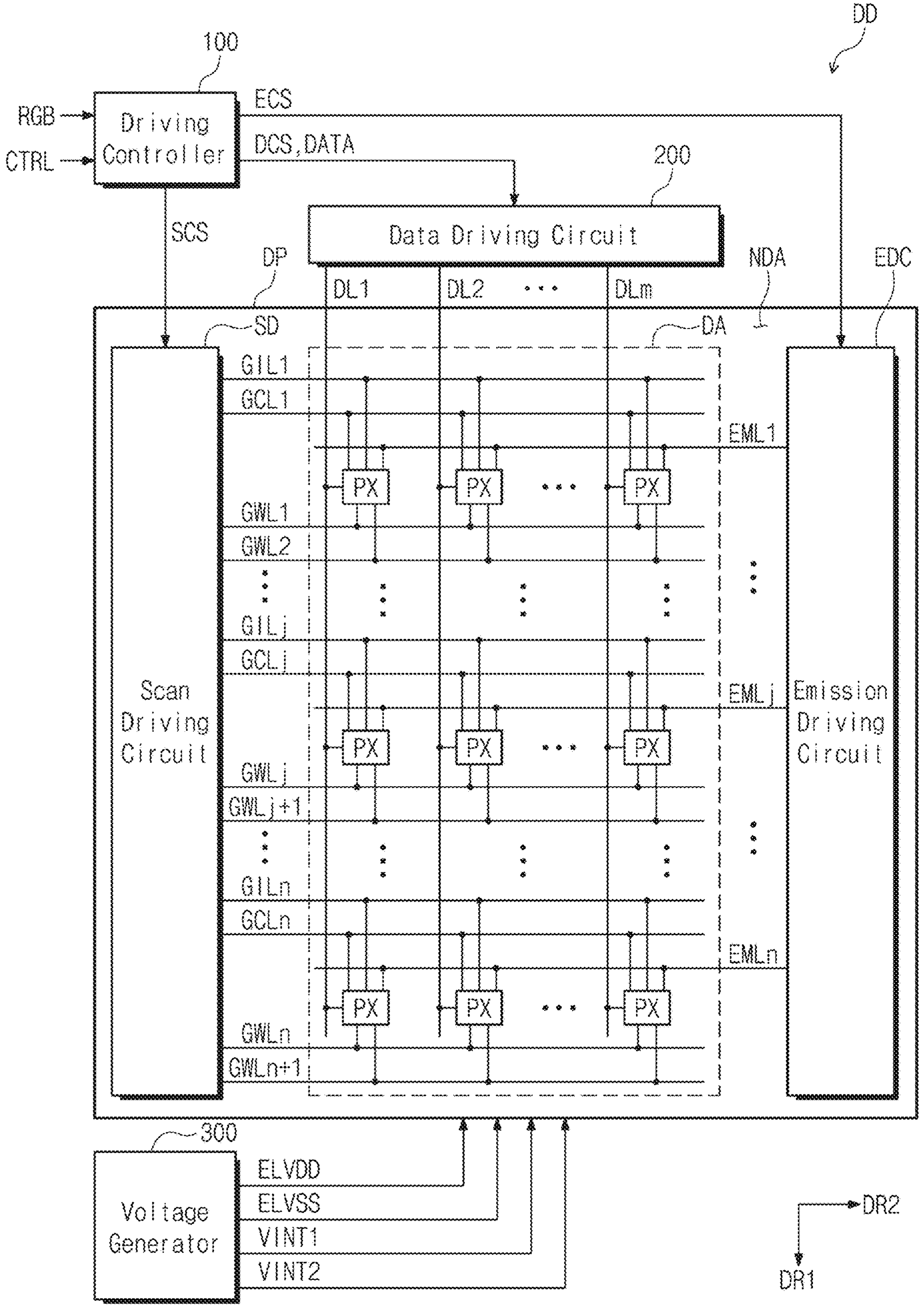
FIG. 4 is a block diagram of a display device according to an embodiment of the disclosure.

FIG. 4 is a block diagram of a display device according to an embodiment of the disclosure.

Referring to FIG. 4, an embodiment of the display device DD includes a display panel DP, a driving controller 100, a data driving circuit 200, and a voltage generator 300.

The driving controller 100 receives an input image signal RGB and a control signal CTRL. The driving controller 100 generates an output image signal DATA by converting a data format of the input image signal RGB in compliance with the specification for an interface with the data driving circuit 200. The driving controller 100 outputs a scan control signal SCS, a data control signal DCS, and an emission control signal ECS.

The driving controller 100 according to an embodiment of the disclosure may determine an operating mode to be one of the normal frequency mode and the multi-frequency mode, based on the input image signal RGB. In an embodiment, the driving controller 100 may determine an operating mode to be one of the normal frequency mode and the multi-frequency mode, based on mode information included in the control signal CTRL.

The data driving circuit 200 receives the data control signal DCS and the output image signal DATA from the driving controller 100. The data driving circuit 200 converts the output image signal DATA into data signals and then outputs the data signals to a plurality of data lines DL1 to DLm to be described later. The data signals refer to analog voltages corresponding to a grayscale value of the output image signal DATA.

The voltage generator 300 generates voltages used for an operation of the display panel DP. In an embodiment, the voltage generator 300 generates a first driving voltage ELVDD, a second driving voltage ELVSS, a first initialization voltage VINT1, and a second initialization voltage VINT2.

The display panel DP includes scan lines GIL1 to GILn, GCL1 to GCLn, and GWL1 to GWLn+1, emission control lines EML1 to EMLn, the data lines DL1 to DLm, and the pixels PX. The display panel DP may further include a scan driving circuit SD and an emission driving circuit EDC. In an embodiment, the scan driving circuit SD is disposed on a first side of the display panel DP. The scan lines GIL1 to GILn, GCL1 to GCLn, and GWL1 to GWLn+1 extend from the scan driving circuit SD in the second direction DR2.

The emission driving circuit EDC is disposed on a second side of the display panel DP. The emission control lines EML1 to EMLn extend from the emission driving circuit EDC in a direction opposite to the second direction DR2.

The scan lines GIL1 to GILn, GCL1 to GCLn, and GWL1 to GWLn+1 and the emission control lines EML1 to EMLn are arranged to be spaced from each other in the first direction DR1. The data lines DL1 to DLm extend from the data driving circuit 200 in the first direction DR1 and are arranged to be spaced from each other in the second direction DR2.

In an embodiment, as illustrated in FIG. 4, the scan driving circuit SD and the emission driving circuit EDC are arranged to face each other, with the pixels PX interposed therebetween, but the disclosure is not limited thereto. In an alternative embodiment, for example, the scan driving circuit SD and the emission driving circuit EDC may be disposed adjacent to each other on the first side or the second side of the display panel DP. In such an embodiment, the scan driving circuit SD and the emission driving circuit EDC may be implemented with one circuit.

The plurality of pixels PX are electrically connected with the scan lines GIL1 to GILn, GCL1 to GCLn, and GWL1 to GWLn+1, the emission control lines EML1 to EMLn, and the data lines DL1 to DLm. Each of the plurality of pixels PX may be electrically connected with four scan lines and one emission control line. In an embodiment, for example, as illustrated in FIG. 4, the pixels PX in a first row may be connected with the scan lines GIL', GCL1, GWL1, and GWL2 and the emission control line EML1. In such an embodiment, the pixels PX in a j-th row may be connected with the scan lines GILj, GCLj, GWLj, and GWLj+1 and the emission control line EMLj.

Each of the plurality of pixels PX includes a light emitting device ED (refer to FIG. 5) and a pixel circuit PXC (refer to FIG. 5) for controlling the emission of the light emitting device ED. The pixel circuit PXC may include one or more transistors and one or more capacitors. The scan driving circuit SD and the emission driving circuit EDC may include transistors formed through a same process as the pixel circuit PXC.

Each of the plurality of pixels PX receives the first driving voltage ELVDD, the second driving voltage ELVSS, the first initialization voltage VINT1, and the second initialization voltage VINT2 from the voltage generator 300.

The scan driving circuit SD receives the scan control signal SCS from the driving controller 100. The scan driving circuit SD may output scan signals to the scan lines GIL1 to GILn, GCL1 to GCLn, and GWL1 to GWLn+1 in response to the scan control signal SCS. A circuit configuration and an operation of the scan driving circuit SD will be described in detail later.

The driving controller 100 according to an embodiment may determine the operating mode based on the input image signal RGB, may divide the display panel DP into the first display area DA1 (refer to FIG. 1) and the second display area DA2 (refer to FIG. 1) based on the determined operating mode, and may set driving frequencies of the first display area DA1 and the second display area DA2 independently of each other. In an embodiment, for example, in the normal node, the driving controller 100 drives the first display area DA1 and the second display area DA2 at the normal frequency (e.g., 120 Hz). In such an embodiment, in the multi-frequency mode, the driving controller 100 may drive the first display area DA1 at the first driving frequency (e.g., 120 Hz) and may drive the second display area DA2 at the second driving frequency (e.g., 1 Hz).

Figure 5:
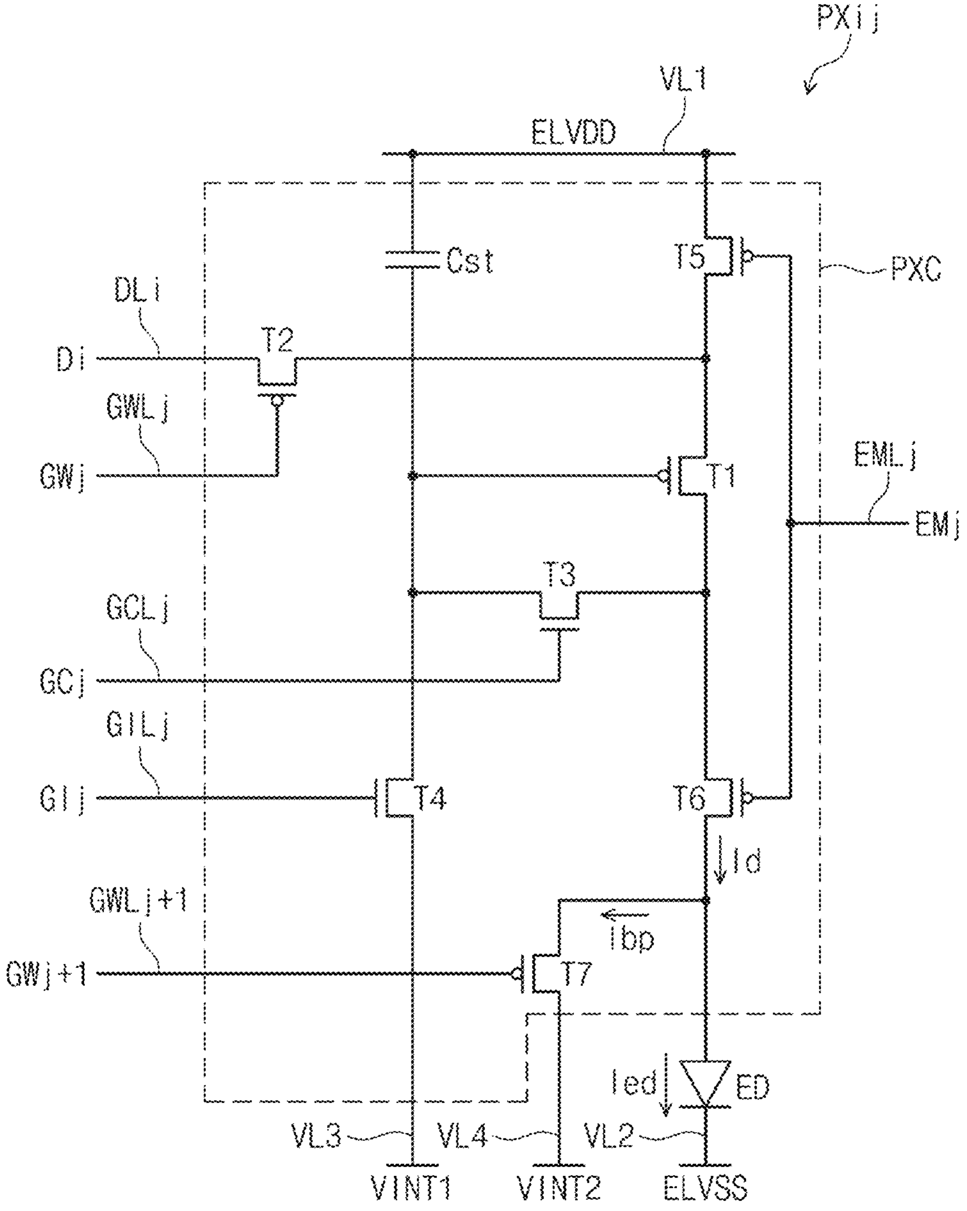
FIG. 5 is an equivalent circuit diagram of a pixel according to an embodiment of the disclosure.

FIG. 5 is an equivalent circuit diagram of a pixel according to an embodiment of the disclosure.

FIG. 5 illustrates an embodiment of a pixel PXij which is connected with the i-th data line DLi of the data lines DL1 to DLm (refer to FIG. 4), the j-th scan lines GILj, GCLj, and GWLj and the (j+1)-th scan line GWLj+1 of the scan lines GIL1 to GILn, GCL1 to GCLn, and GWL1 to GWLn+1 (refer to FIG. 4), and the j-th emission control line EMLj of the emission control lines EML1 to EMLn (refer to FIG. 4).

A circuit configuration of each of the plurality of pixels PX illustrated in FIG. 4 may be identical to an equivalent circuit configuration of the pixel PXij illustrated in FIG. 5. In a display device according to an embodiment, the pixel PXij includes a pixel circuit PXC and at least one light emitting device ED. In an embodiment, the light emitting device ED may be an organic light emitting diode. The pixel circuit PXC includes first to seventh transistors T1, T2, T3, T4, T5, T6, and T7 and a capacitor Cst.

In an embodiment, the third and fourth transistors T3 and T4 of the first to seventh transistors T1 to T7 are N-type transistors including an oxide semiconductor layer, and each of the first, second, fifth, sixth, and seventh transistors T1, T2, T5, T6, and T7 is a P-type transistor including a low-temperature polycrystalline silicon (LTPS) semiconductor layer. However, the disclosure is not limited thereto. In an alternative embodiment, for example, all the first to seventh transistors T1 to T7 may be P-type transistors or N-type transistors. In an embodiment, at least one selected from the first to seventh transistors T1 to T7 may be an N-type transistor, and the remaining transistors may be P-type transistors. However, the pixel circuit configuration according to embodiments of the disclosure is not limited to FIG. 5. The pixel circuit PXC illustrated in FIG. 5 is only an example. In an embodiment, for example, the configuration of the pixel circuit PXC may be modified and implemented.

The j-th scan lines GILj, GCLj, and GWLj may respectively transfer scan signals GIj, GCj, and GWj, and the (j+1)-th scan line GWLj+1 may transfer a (j+1)-th scan signal GWj+1. The emission control line EMLj transfers an emission signal EMj, and the i-th data line DLi transfers an i-th data signal Di. In the following description, the i-th data signal Di is referred to as a "data signal Di". The data signal Di may have a voltage level corresponding to the input image signal RGB input to the display device DD (refer to FIG. 4) or a voltage level corresponding to a bias voltage. The bias voltage will be described in detail later. First to fourth driving voltage lines VL1, VL2, VL3, and VL4 may respectively transfer the first driving voltage ELVDD, the second driving voltage ELVSS, the first initialization voltage VINT', and the second initialization voltage VINT2.

The first transistor T1 includes a first electrode connected with the first driving voltage line VL1 through the fifth transistor T5, a second electrode electrically connected with an anode of the light emitting device ED through the sixth transistor T6, and a gate electrode connected with a first end of the capacitor Cst. The first transistor T1 may receive the data signal Di transferred through the data line DLi based on a switching operation of the second transistor T2 and may supply a driving current Id to the light emitting device ED.

The second transistor T2 includes a first electrode connected with the data line DLi, a second electrode connected with the first electrode of the first transistor T1, and a gate electrode connected with the scan line GWLj. The second transistor T2 may be turned on based on the scan signal GWj transferred through the scan line GWLj and may transfer the data signal Di from the data line DLi to the first electrode of the first transistor T1.

The third transistor T3 includes a first electrode connected with the gate electrode of the first transistor T1, a second electrode connected with the second electrode of the first transistor T1, and a gate electrode connected with the scan line GCLj. The third transistor T3 may be turned on based on the scan signal GCj transferred through the scan line GCLj, and thus, the gate electrode and the second electrode of the first transistor T1 may be connected with each other, that is, the first transistor T1 may be diode-connected.

The fourth transistor T4 includes a first electrode connected with the gate electrode of the first transistor T1, a second electrode connected with the third driving voltage line VL3 through which the first initialization voltage VINT1 is transferred, and a gate electrode connected with the scan line GILj. The fourth transistor T4 may be turned on based on the scan signal GIj transferred through the scan line GILj, and thus, the first initialization voltage VINT' may be transferred to the gate electrode of the first transistor T1, such that a voltage of the gate electrode of the first transistor T1 may be initialized. This operation may be referred to as an "an initialization operation".

The fifth transistor T5 includes a first electrode connected with the first driving voltage line VL1, a second electrode connected with the first electrode of the first transistor T1, and a gate electrode connected with the emission control line EMLj.

The sixth transistor T6 includes a first electrode connected with the second electrode of the first transistor T1, a second electrode connected with the anode of the light emitting device ED, and a gate electrode connected with the emission control line EMLj.

The fifth transistor T5 and the sixth transistor T6 may be simultaneously turned on based on the emission signal EMj transferred through the emission control line EMLj, such that the first driving voltage ELVDD may be compensated for through the diode-connected transistor T1 to be supplied to the light emitting device ED.

The seventh transistor T7 includes a first electrode connected with the second electrode of the sixth transistor T6, a second electrode connected with the fourth driving voltage line VL4, and a gate electrode connected with the scan line GWLj+1. The seventh transistor T7 is turned on based on the scan signal GWj+1 transferred through the scan line GWLj+1 and bypasses a current of the anode of the light emitting device ED to the fourth driving voltage line VL4.

The first end of the capacitor Cst is connected with the gate electrode of the first transistor T1 as described above, and a second end of the capacitor Cst is connected with the first driving voltage line VL1. A cathode of the light emitting device ED may be connected with the second driving voltage line VL2 that transfers the second driving voltage ELVS S. A structure of the pixel PXij according to an embodiment is not limited to the structure illustrated in FIG. 5. In an embodiment, for example, in one pixel, the number of transistors, the number of capacitors, and the connection relationship thereof may be variously modified.

Figure 6:
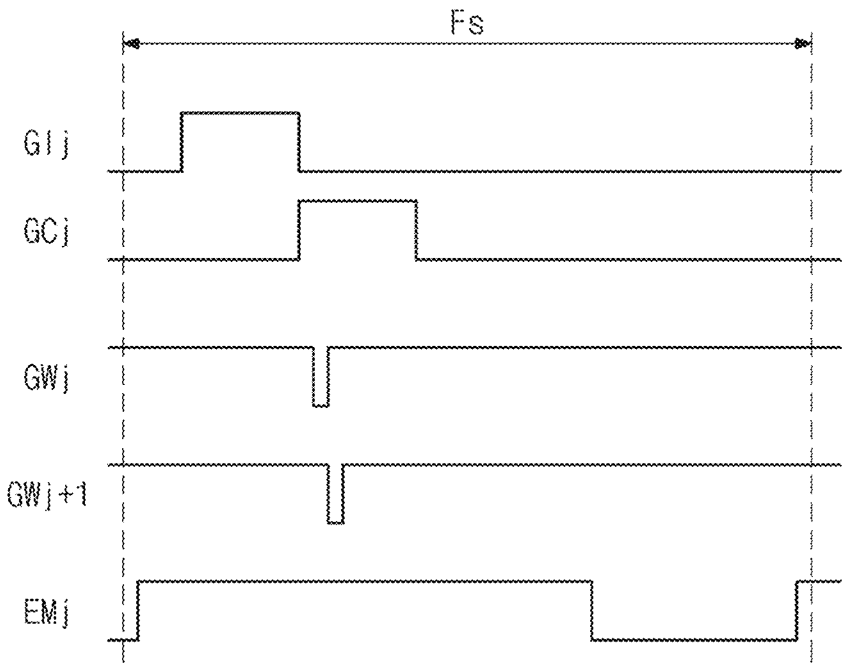
FIG. 6 is a timing diagram for describing an operation of a pixel illustrated in FIG. 5.

FIG. 6 is a timing diagram for describing an operation of a pixel illustrated in FIG. 5. An operation of a display device according to an embodiment will be described with reference to FIGS. 5 and 6.

Referring to FIGS. 5 and 6, the scan signal GIj of a high level is provided through the scan line GILj during the initialization period within one frame Fs. When the fourth transistor T4 is turned on in response to the scan signal GIj of the high level, the first initialization voltage VINT1 is supplied to the gate electrode of the first transistor T1 through the fourth transistor T4 such that the first transistor T1 is initialized.

Next, when the scan signal GCj of the high level is supplied through the scan line GCLj during a data programming and compensation period, the third transistor T3 is turned on. The first transistor T1 is diode-connected by the third transistor T3 thus turned on and is forward-biased. Also, the second transistor T2 is turned on by the scan signal GWj of a low level. As such, a compensation voltage, which is obtained by subtracting a threshold voltage of the first transistor T1 from a voltage of the data signal Di supplied from the data line DLi, is applied to the gate electrode of the first transistor T1. That is, a gate voltage applied to the gate electrode of the first transistor T1 may be the compensation voltage.

In this case, as the first driving voltage ELVDD and the compensation voltage are respectively applied to opposite ends of the capacitor Cst, charges corresponding to a voltage difference of the opposite ends of the capacitor Cst may be stored in the capacitor Cst.

During the data programming and compensation period, the seventh transistor T7 is turned on in response to the scan signal GWj+1 of the low level transferred through the scan line GWLj+1. A portion of the driving current Id may be drained through the seventh transistor T7 as a bypass current Ibp.

In the case where the light emitting device ED emits a light under the condition that a minimum current of the first transistor T1 flows as a driving current for the purpose of displaying a black image, the black image may not be normally displayed. Accordingly, the seventh transistor T7 of the pixel PXij according to an embodiment of the disclosure may drain a portion of the minimum current of the first transistor T1 to a current path, which is different from a current path to the light emitting device ED, as the bypass current Ibp. Herein, the minimum current of the first transistor T1 means a current flowing under the condition that a gate-source voltage of the first transistor T1 is smaller than the threshold voltage, that is, the first transistor T1 is turned off. As a minimum driving current (e.g., a current of 10 pA or less) is transferred to the light emitting device ED, with the first transistor T1 turned off, an image of black luminance is expressed. When the minimum driving current for displaying a black image flows, the influence of a bypass transfer of the bypass current Ibp may be great. However, when a large driving current for displaying an image such as a normal image or a white image flows, there may be almost no influence of the bypass current Ibp. Accordingly, when a driving current for displaying a black image flows, a light emitting current Ted of the light emitting device ED, which corresponds to a result of subtracting the bypass current Ibp drained through the seventh transistor T7 from the driving current Id, may have a minimum current amount to such an extent as to accurately express a black image. Accordingly, a contrast ratio may be improved by accurately implementing an image of black luminance by using the seventh transistor T7. In an embodiment, the bypass signal is the scan signal GWj+1 of the low level but is not limited thereto.

Next, during an emission period, the emission signal EMj supplied from the emission control line EMLj transitions from the high level to the low level. During the emission period, the fifth transistor T5 and the sixth transistor T6 are turned on by the emission signal EMj of the low level. In this case, the driving current Id is generated depending on a difference between the gate voltage of the gate electrode of the first transistor T1 and the first driving voltage ELVDD and is supplied to the light emitting device ED through the sixth transistor T6. That is, the current led flows through the light emitting device ED.

Figure 7:
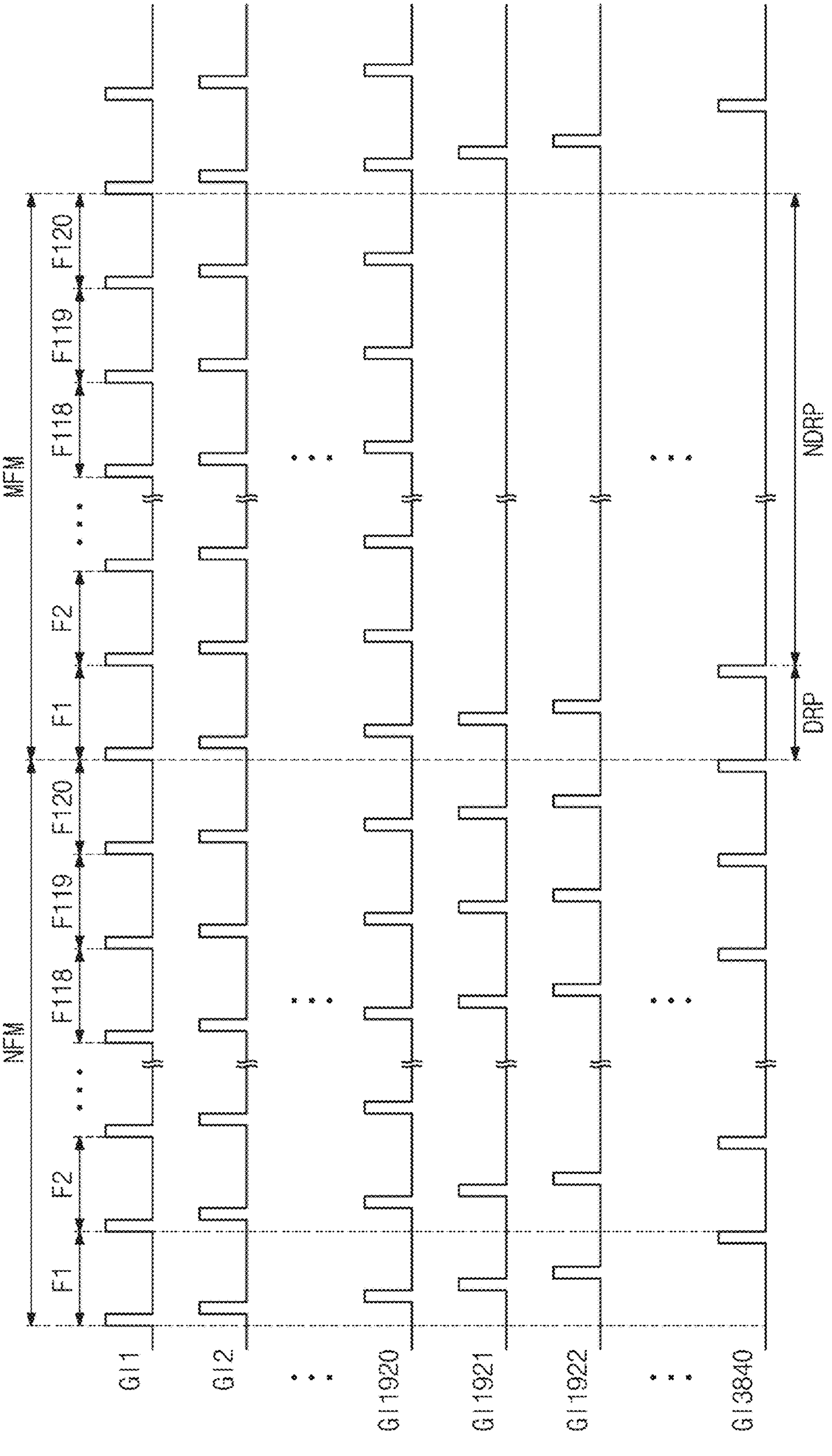
FIG. 7 illustrates scan signals in a normal frequency mode and a multi-frequency mode.

FIG. 7 illustrates scan signals GI1 to GI3840 in the normal frequency mode NFM and the multi-frequency mode MFM.

An embodiment of the scan signals GI1 to GI3840 are illustrated in FIG. 7. In such an embodiment, the frequency of the scan signals GI1 to GI3840 is 120 Hz in the normal frequency mode NFM.

In an embodiment, in the multi-frequency mode MFM, the scan signals Gil to GI1920 correspond to the first display area DA1 of the display device DD illustrated in FIG. 1, and the scan signals GI1921 to GI3840 correspond to the second display area DA2 of the display device DD.

In the multi-frequency mode MFM, the scan signals GI1 to GI1920 may be activated to the high level in each of the first to 120th frames F1 to F120, and the scan signals GI1921 to GI3840 may be activated to the high level only in the first frame F1. That is, in the multi-frequency mode MFM, the frequency of each of the scan signals GI1 to GI1920 is 120 Hz, and the frequency of each of the scan signals GI1921 to GI3840 may be 1 Hz.

In such an embodiment, the first frame F1 may correspond to a driving period DRP in which the second display area DA2 is driven, and the second to 120th frames F2 to F120 may correspond to a non-driving period NDRP in which the second display area DA2 is not driven.

Accordingly, the first display area DA1 in which a video is displayed may be driven in response to the scan signals GI1 to GI1920 of the first driving frequency (e.g., 120 Hz), and the second display area DA2 in which a still image is displayed may be driven in response to the scan signals GI1921 to GI3840 of the second driving frequency (e.g., 1 Hz). In such an embodiment, as the first display area DA1 in which a video is displayed is driven by using the first driving frequency, the display quality of the video may be maintained. In such an embodiment, because the second display area DA2 in which a still image is displayed is driven by using the second driving frequency lower than the first driving frequency, power consumption may be reduced.

FIG. 7 illustrates only an embodiment of the scan signals GI1 to GI3840. However, as in the scan signals GI1 to GI3840, the scan driving circuit SD (refer to FIG. 4) may generate scan signals GC1 to GC3840.

Figure 8:
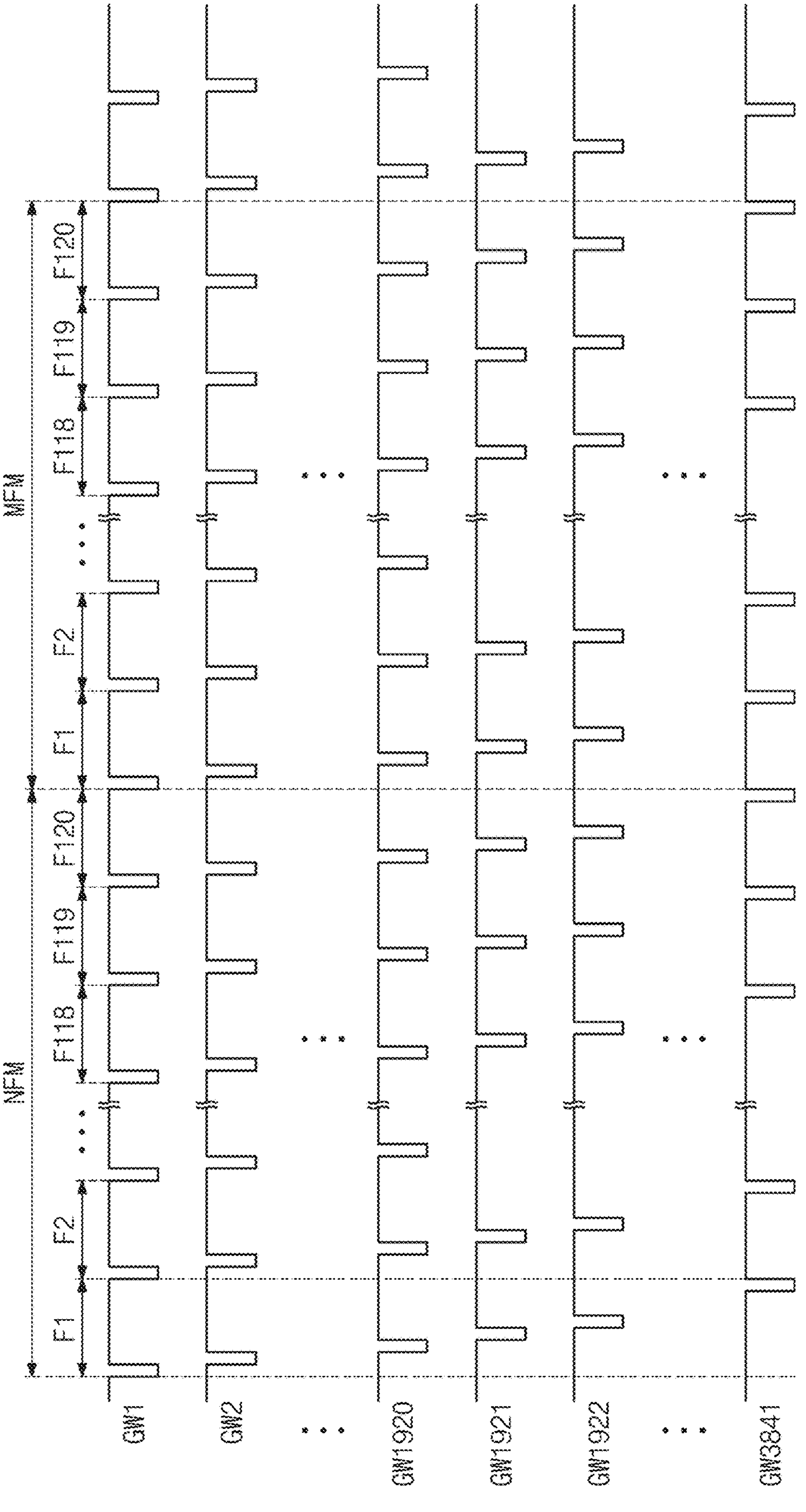
FIG. 8 illustrates scan signals in a normal frequency mode and a multi-frequency mode.

FIG. 8 illustrates scan signals GW1 to GW3841 in the normal frequency mode NFM and the multi-frequency mode MFM.

An embodiment of the scan signals GW1 to GW3841 are illustrated in FIG. 8. In such an embodiment, the frequency of the scan signals GW1 to GW3841 is 120 Hz in the normal frequency mode NFM. In such an embodiment, the frequency of the scan signals GW1 to GW3841 is 120 Hz in the multi-frequency mode MFM. That is, the frequency of the scan signals GW1 to GW3841 in the multi-frequency mode MFM is the same as that in the normal frequency mode NFM.

Referring to FIGS. 1, 4, 7, and 8, in the normal frequency mode NFM, the driving controller 100 provides the data driving circuit 200 with the output image signal DATA corresponding to the input image signal RGB. Accordingly, voltage levels of data signals that are provided to the data lines DL1 to DLm may be determined by the output image signal DATA.

During the first frame F1 of the multi-frequency mode MFM, the driving controller 100 provides the data driving circuit 200 with the output image signal DATA corresponding to the input image signal RGB.

When the first display area DA1 is driven in each of the second to 120th frames F2 to F120 of the multi-frequency mode MFM, the driving controller 100 provides the data driving circuit 200 with the output image signal DATA corresponding to the input image signal RGB.

When the second display area DA2 is driven in each of the second to 120th frames F2 to F120 of the multi-frequency mode MFM, the driving controller 100 provides the data driving circuit 200 with the output image signal DATA corresponding to a bias signal.

Referring back to FIG. 5, in the normal frequency mode NFM, the data signal Di corresponding to the input image signal RGB may be provided to the i-th data line DLi.

During the first frame F1 of the multi-frequency mode MFM, the data signal Di corresponding to the input image signal RGB may be provided to the i-th data line DLi.

During the second to 120th frames F2 to F120 of the multi-frequency mode MFM, the data signal Di corresponding to the bias signal may be provided to the i-th data line DLi.

During the second to 120th frames F2 to F120 of the multi-frequency mode MFM, the scan signals GIj and GCj may be maintained at the low level being a disable level (refer to FIG. 7), and the valid data signal Di may not be provided to the i-th data line DLi.

The threshold voltage of the first transistor T1 may also change depending on a gate-source voltage of the first transistor T1. In an embodiment, for example, the threshold voltage of the first transistor T1 may have a first average level during the low-to-high transition of the gate-source voltage and may have a second average level different from the first average level during the high-to-low transition of the gate-source voltage. Different current-voltage (I-V) characteristic curves may be drawn due to the first average level and the second average level. The dependency of the threshold voltage on the gate-source voltage may be referred to as a "hysteresis of a transistor".

According to the hysteresis characteristic of the first transistor T1, the driving current of the first transistor T1, which is determined by the data signal Di of the current frame, may be affected by the data signal Di applied in the previous frame. In an embodiment, for example, where the data signal Di for displaying an image of a low gray scale is provided in a previous frame and then the data signal Di for displaying an image of a specific gray scale is provided in a current frame, an image of a gray scale higher than the specific gray scale of the current frame may be displayed by the light emitting device ED.

In an embodiment, where the data signal Di for displaying an image of a high gray scale is provided in a previous frame and then the data signal Di for displaying an image of a specific gray scale is provided in a current frame, an image of a gray scale lower than the specific gray scale of the current frame may be displayed by the light emitting device ED.

The issue due to the hysteresis characteristic of the first transistor T1 described above may not occur when a change period of the data signal Di is fast, that is, when a driving frequency of the display device DD is high. However, as the driving frequency of the display device DD decreases, the change period of the data signal Di may become longer. Accordingly, a change in luminance according to the hysteresis characteristic of the first transistor T1 may be perceived by the user when the display device DD is driven at a low driving frequency.

In an embodiment, during the second to 120th frames F2 to F120 of the multi-frequency mode MFM, the data signal Di of a given voltage level corresponding to the bias signal may be provided to the first electrode of the first transistor T1. The gate-source voltage of the first transistor T1 may be initialized by providing a specific voltage to the first electrode of the first transistor T1. Accordingly, a change in luminance of the light emitting device ED due to the hysteresis characteristic of the first transistor T1 may decrease.

However, in the case where a frequency difference of the first display area DA1 and the second display area DA2 is great in the multi-frequency mode MFM and where the operating mode changes from the multi-frequency mode MFM to the normal frequency mode NFM after the multi-frequency mode MFM is maintained during a long time, an afterimage may be visually perceived at a boundary of the second display area DA2, which is adjacent to the first display area DA1.

Figure 9:
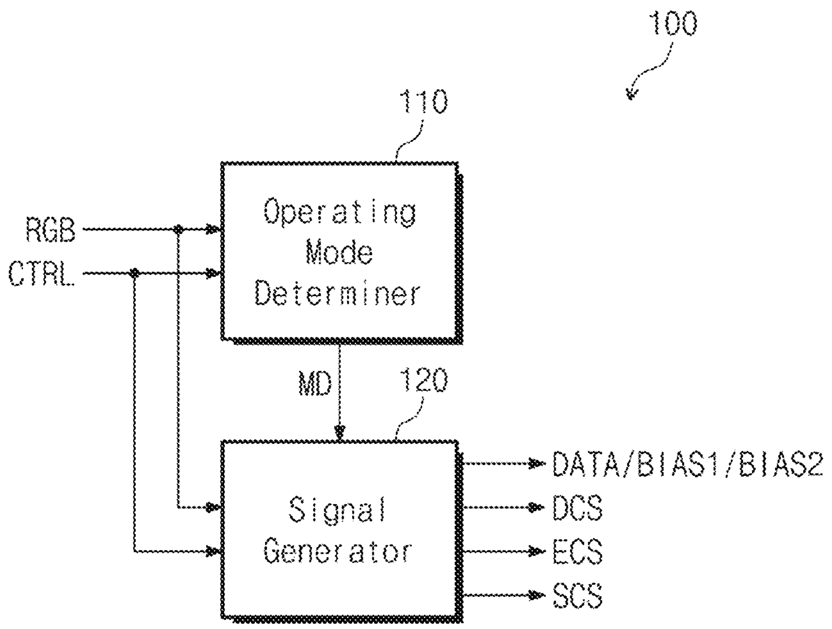
FIG. 9 is a block diagram illustrating a configuration of a driving controller according to an embodiment of the disclosure.

FIG. 9 is a block diagram illustrating a configuration of a driving controller according to an embodiment of the disclosure.

Referring to FIGS. 4 and 9, an embodiment of the driving controller 100 includes an operating mode determiner 110 and a signal generator 120. The operating mode determiner 110 determines a frequency mode based on the input image signal RGB and the control signal CTRL and outputs a mode signal MD corresponding to the determined frequency mode. In an embodiment, the operating mode determiner 110 may determine the operating mode based on mode information included in the control signal CTRL provided from the outside (e.g., a main processor or a graphics processor). In an embodiment, for example, while a specific application program is executed, the operating mode determiner 110 may output the mode signal MD indicating the multi-frequency mode. The mode signal MD may include information about the first driving frequency of the first display area DA1 and the second driving frequency of the second display area DA2, in addition to information indicating whether the operating mode is the normal frequency mode or the multi-frequency mode. In an embodiment, the mode signal MD may include information about a start location and/or a boundary area of the second display area DA2.

The signal generator 120 outputs the output image signal DATA, the data control signal DCS, the emission control signal ECS, and the scan control signal SCS in response to the input image signal RGB, the control signal CTRL, and the mode signal MD.

When the mode signal MD indicates the normal frequency mode, the signal generator 120 may output the output image signal DATA, the data control signal DCS, the emission control signal ECS, and the scan control signal SCS such that the first display area DA1 (refer to FIG. 1) and the second display area DA2 (refer to FIG. 1) are driven at the first driving frequency.

When the mode signal MD indicates the multi-frequency mode, the signal generator 120 may output the output image signal DATA, the data control signal DCS, the emission control signal ECS, and the scan control signal SCS such that the first display area DA1 is driven at the first driving frequency and the second display area DA2 are driven at the second driving frequency.

While the mode signal MD indicates the multi-frequency mode, the signal generator 120 may sequentially output the output image signal DATA, a first bias signal BIAS1, and a second bias signal BIAS2.

The data driving circuit 200, the scan driving circuit SD, and the emission driving circuit EDC operate in response to the output image signal DATA, the data control signal DCS, the emission control signal ECS, and the scan control signal SCS such that an image is displayed in the display panel DP.

Figure 10:
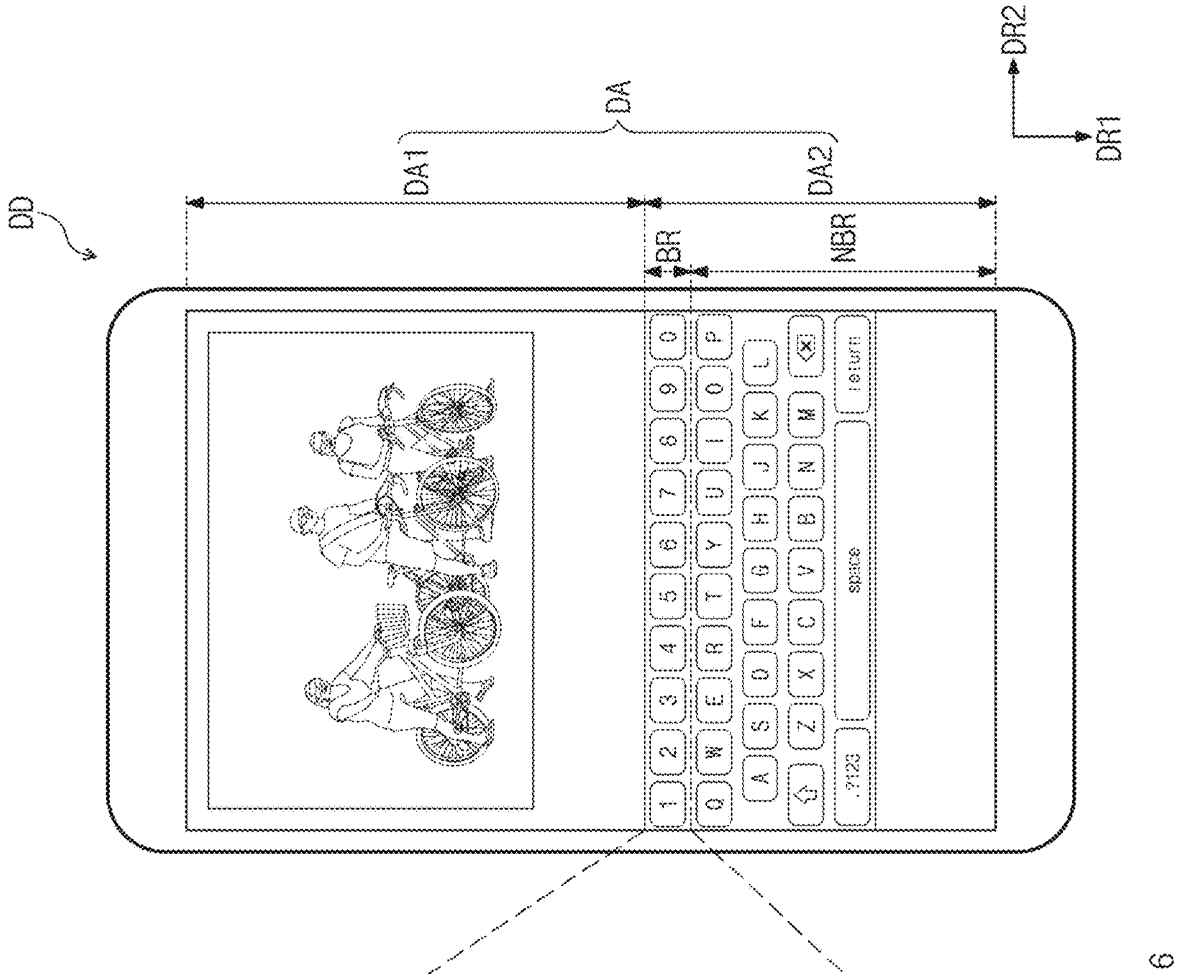
FIG. 10 is a diagram for describing a driving method for decreasing a luminance difference due to an afterimage at a boundary between first and second display areas.

FIG. 10 is a diagram for describing a driving method for decreasing a luminance difference due to an afterimage at a boundary between the first and second display areas DA1 and DA2.

Referring to FIG. 10, an embodiment of the display area DA of the display device DD may include a first horizontal line L1 to an n-th horizontal line Ln. In an embodiment, for example, as illustrated in FIG. 4, the pixels PX belonging to the first horizontal line L1 may be connected with the scan lines GILL GCL1, GWL1, and GWL2 and the emission control line EML1. In such an embodiment, as illustrated in FIG. 4, the pixels PX belonging to the j-th horizontal line Lj may be connected with the scan lines GILj, GCLj, GWLj, and GWLj+1 and the emission control line EMLj.

The first display area DA1 may include the first horizontal line L1 to the k-th horizontal line Lk, and the second display area DA2 may include the (k+1)-th horizontal line Lk+1 to the n-th horizontal line Ln. A portion of the second display area DA2, which is adjacent to the first display area DA1, that is, the (k-th)-th horizontal line Lk+1 to the (k+16)-th horizontal line Lk+16 may be provided for the stress boundary diffusion and may be referred to as a "boundary area BR". Hereinafter, embodiments where the number of horizontal lines included in the boundary area BR is 16 will be described in detail, but the disclosure is not limited thereto. In an embodiment, as shown in FIG. 10, the boundary area BR may be included in the second display area DA2, but the disclosure is not limited thereto. In an alternative embodiment, for example, the boundary area BR may include a portion of the first display area DA1 and a portion of the second display area DA2. In another alternative embodiment, the boundary area BR may include only a portion of the first display area DA1.

The remaining portion of the second display area DA2 other than the boundary area BR may be referred to as a non-boundary area NBR.

In the multi-frequency mode MFM illustrated in FIG. 7, a data signal of a voltage level Vdata (shown in FIG. 10) corresponding to the output image signal DATA may be provided to the pixels PX (i.e., first pixels) of the first display area DA1.

In the driving period DRP of the multi-frequency mode MFM, a data signal of the voltage level Vdata corresponding to the output image signal DATA may be provided to the pixels PX (i.e., second pixels) of the second display area DA2.

In the non-driving period NDRP of the multi-frequency mode MFM, a data signal of a first voltage level Vbias1 (shown in FIG. 10) corresponding to the first bias signal BIAS1 may be provided to pixels of the boundary area BR belonging to the second display area DA2.

In the non-driving period NDRP of the multi-frequency mode MFM, a data signal of a second voltage level Vbias2 (shown in FIG. 10) corresponding to the second bias signal BIAS2 different from the first bias signal BIAS1 may be provided to pixels of the non-boundary area NBR belonging to the second display area DA2. The first voltage level Vbias1 and the second voltage level Vbias2 may be different from each other.

Data signals that are provided to the pixels PX of the (k+1)-th horizontal line Lk+1 to the (k+16)-th horizontal line Lk+16, that is, pixels of the boundary area BR, may have the same voltage level as or different voltage levels from each other.

In an embodiment, a voltage level of data signals that are provided to the pixels PX of the (k+1)-th horizontal line Lk+1 may be (Vp+Vo1), a voltage level of data signals that are provided to the pixels PX of the (k+2)-th horizontal line Lk+2 may be (Vp+Vo2), and a voltage level of data signals that are provided to the pixels PX of the (k+16)-th horizontal line Lk+16 may be (Vp+Vo16).

When a reference voltage level Vp and the second voltage level Vbias2 have the relationship of "Vp<Vbias2", offset voltages Vo1 to Vo16 may have the following relationship: Vo1<Vo2<Vo3<<Vo16. In an embodiment, each of the offset voltages Vo1 to Vo16 may be greater than or equal to "0". Also, the voltage level "Vp+Vo16" of the data signals that are provided to the pixels PX of the (k+16)-th horizontal line Lk+16 may be smaller than or equal to the second voltage level Vbias2.

Figure 11:
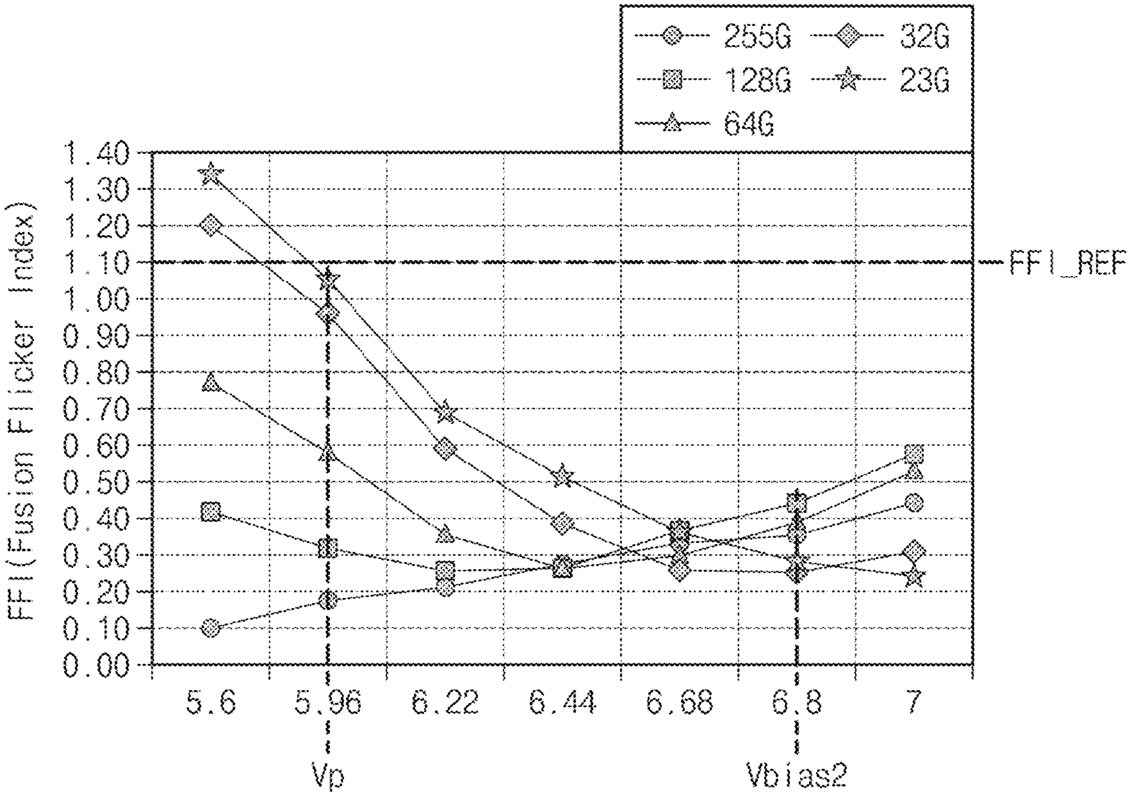
FIG. 11 is a diagram illustrating a relationship between a voltage level of a data signal and a fusion flicker index according to a gray scale level of an output image signal.

FIG. 11 is a diagram illustrating a relationship between a voltage level of a data signal and a fusion flicker index (FFI) according to a gray scale level of the output image signal DATA.

FIG. 11 shows a relationship between the fusion flicker index (FFI) and a voltage level of the data signal Di (refer to FIG. 5) provided to the first electrode of the first transistor T1 (refer to FIG. 5) during the non-driving period NDRP when a data signal to be provided to the second display area DA2 is at a 23 gray scale level 23G, at a 32 gray scale level 32G, at a 64 gray scale level 64G, at a 128 gray scale level 128G, and at a 255 gray scale level 255G.

Referring to FIGS. 9 and 11, the second voltage level Vbias2 may be set to a voltage level at which the fusion flicker index (FFI) of all the gray scales 23G, 32G, 64G, 128G, and 255G is minimum when the second driving frequency is at the lowest level.

The lowest voltage at which the fusion flicker index (FFI) of all the gray scales 23G, 32G, 64G, 128G, and 255G is smaller than a reference level FFI REF may be selected as the reference voltage level Vp. The reference level FFI REF may be set to a level at which the user does not perceive a flicker.

Figure 12:
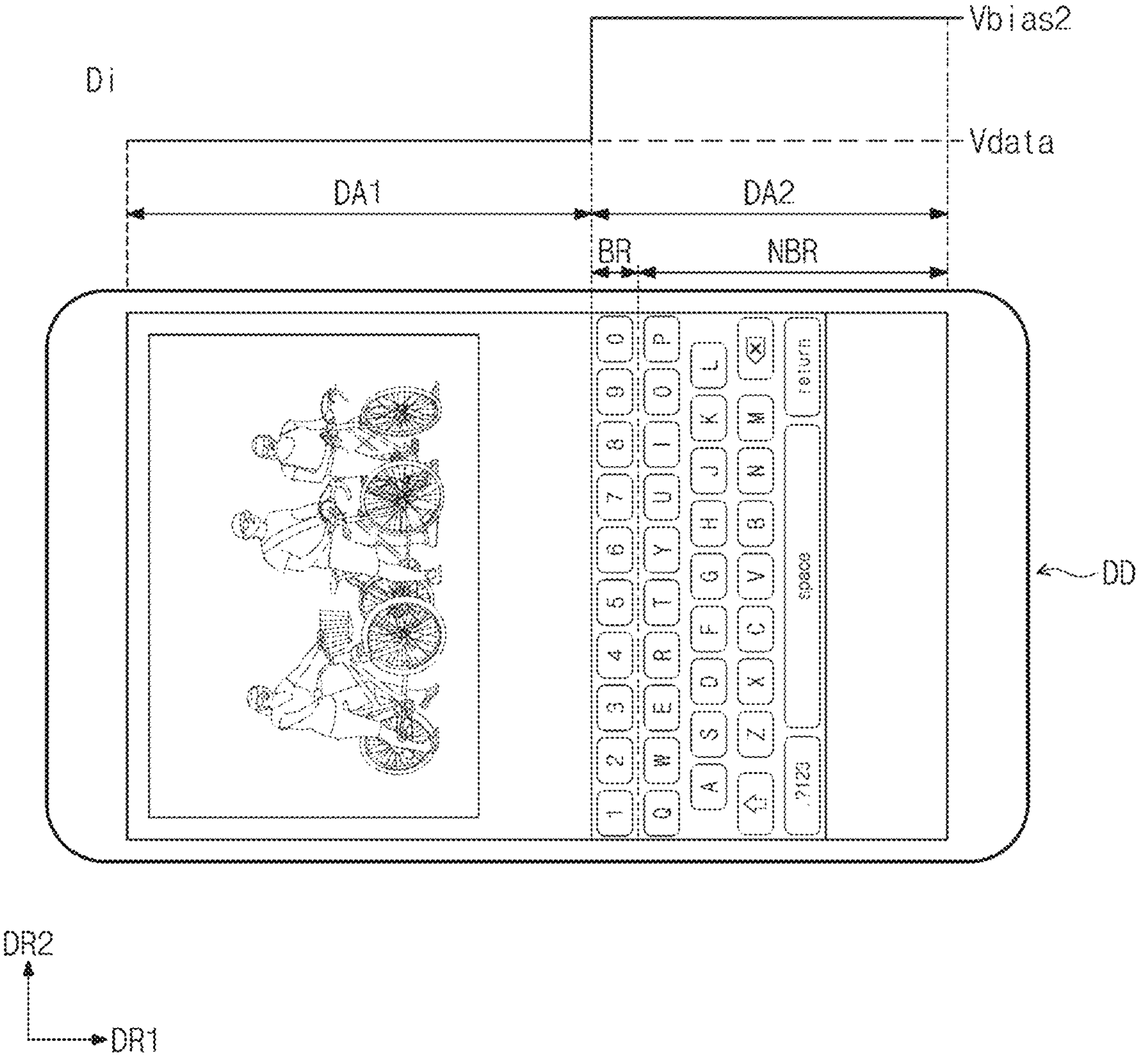
FIG. 12 illustrates a data signal provided to an I-th data line during a non-driving period of a multi-frequency mode.

FIG. 12 illustrates the data signal Di provided to the i-th data line DLi during the non-driving period NDRP of the multi-frequency mode MFM.

Referring to FIG. 12, because the first display area DA1 is driven at the first driving frequency in the multi-frequency mode MFM, the data signal Di that is provided to the i-th data line DLi while the first display area DA1 is driven has the voltage level Vdata corresponding to the output image signal DATA.

The data signal Di that is provided to the i-th data line DLi during the non-driving period NDRP (refer to FIG. 7) of the multi-frequency mode MFM may have the second voltage level Vbias2 corresponding to the second bias signal BIAS2.

The gate-source voltage of the first transistor T1 (refer to FIG. 5) may be initialized by providing the second voltage level Vbias2 corresponding to the second bias signal BIAS2 to the first electrode of the first transistor T1 during the non-driving period NDRP. Accordingly, a change in luminance of the light emitting device ED due to the hysteresis characteristic of the first transistor T1 may decrease.

However, in the case where a frequency difference of the first display area DA1 and the second display area DA2 is great in the multi-frequency mode MFM and where the operating mode changes from the multi-frequency mode MFM to the normal frequency mode NFM after the multi-frequency mode MFM is maintained during a long time, an afterimage may be visually perceived at a boundary of the second display area DA2, which is adjacent to the first display area DA1.

Figure 13A:
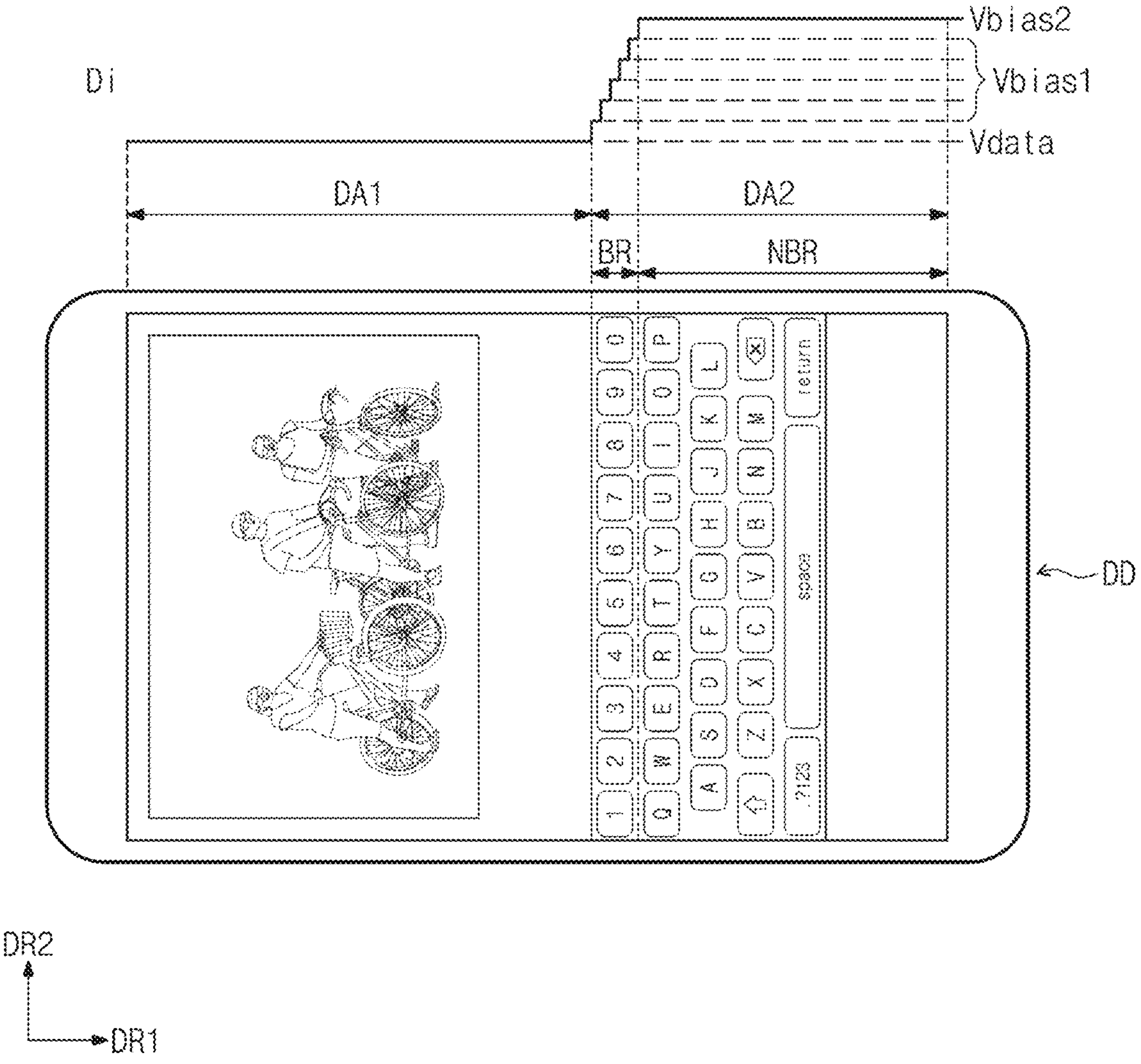
FIG. 13A illustrates a data signal provided to an i-th data line during a non-driving period of a multi-frequency mode.

FIG. 13A illustrates the data signal Di provided to the i-th data line DLi during the non-driving period NDRP of the multi-frequency mode MFM.

Referring to FIG. 13A, because the first display area DA1 is driven at the first driving frequency in the multi-frequency mode MFM, the data signal Di that is provided to the i-th data line DLi while the first display area DA1 is driven has the voltage level Vdata corresponding to the output image signal DATA.

In the non-driving period NDRP (refer to FIG. 7) of the multi-frequency mode MFM, the data signal Di that is provided to the i-th data line DLi while the boundary area BR is driven may have the first voltage level Vbias1 corresponding to the first bias signal BIAS1.

In the non-driving period NDRP of the multi-frequency mode MFM, the data signal Di that is provided to the i-th data line DLi while the non-boundary area NBR is driven may have the second voltage level Vbias2 corresponding to the second bias signal BIAS2. In an embodiment, the first voltage level Vbias1 may be lower than the second voltage level Vbias2.

Figure 13B:
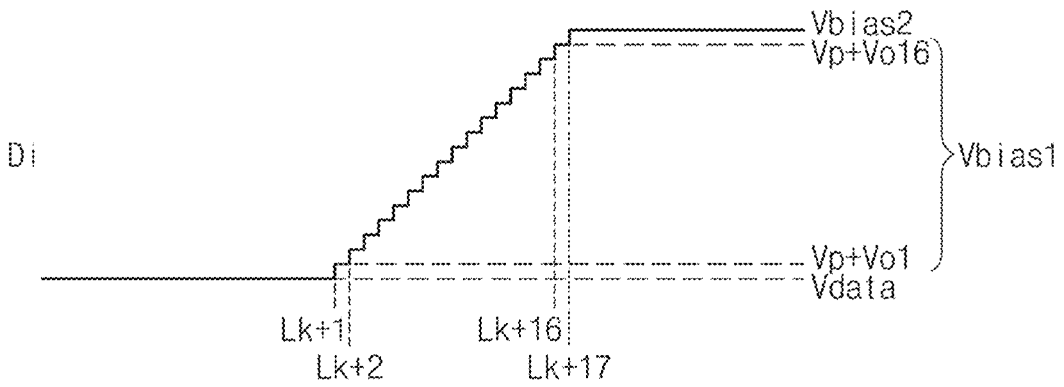
FIG. 13B is an enlarged diagram of a data signal provided to an i-th data line while a boundary area illustrated in FIG. 13A is driven.

FIG. 13B is an enlarged diagram of the data signal Di provided to the i-th data line DLi while the boundary area BR illustrated in FIG. 13A is driven.

Referring to FIGS. 10 and 13B, in an embodiment where the boundary area BR includes the (k+1)-th horizontal line Lk+1 to the (k+16)-th horizontal line Lk+16, a voltage level of the data signal Di may stepwise change from "Vp+Vo1" to "Vp+Vo1 6" while the boundary area BR is driven.

That is, the data signal Di having the voltage level of "Vp+Vo1" may be provided to the pixels PX of the (k+1)-th horizontal line Lk+1, the data signal Di having the voltage level of "Vp+Vo2" may be provided to the pixels PX of the (k+2)-th horizontal line Lk+2, and the data signal Di having the voltage level of "Vp+Vo16" may be provided to the pixels PX of the (k+16)-th horizontal line Lk+16. That is, the first voltage level Vbias1 stepwise increases from the (k+1)-th horizontal line Lk+1 to the (k+16)-th horizontal line Lk+16.

In the pixels PX disposed in the boundary area BR, as a voltage level of a bias signal provided to the first electrode of the first transistor T1 (refer to FIG. 5) is set differently for each horizontal line, the luminance in the boundary area BR due to the afterimage may gradually change. Even though a luminance difference of the first display area DA1 and the second display area DA2 due to the afterimage occurs, the luminance may gradually change in the boundary area BR, and thus, the degree to which the user perceives the luminance difference may be minimized.

In an embodiment, the first voltage level Vbias1 may be greater than or equal to the reference voltage level Vp (refer to FIG. 11) and lower than the second voltage level Vbias2.

An embodiment in which the first voltage levels Vbias1 of the (k+1)-th horizontal line Lk+1 to the (k+16)-th horizontal line Lk+16 are different from each other is illustrated in FIG. 13B, but the disclosure is not limited thereto. In an alternative embodiment, for example, in the (k+1)-th horizontal line Lk+1 to the (k+16)-th horizontal line Lk+16, the first voltage level Vbias1 may be differently set in units of two horizontal lines.

Figure 14A:
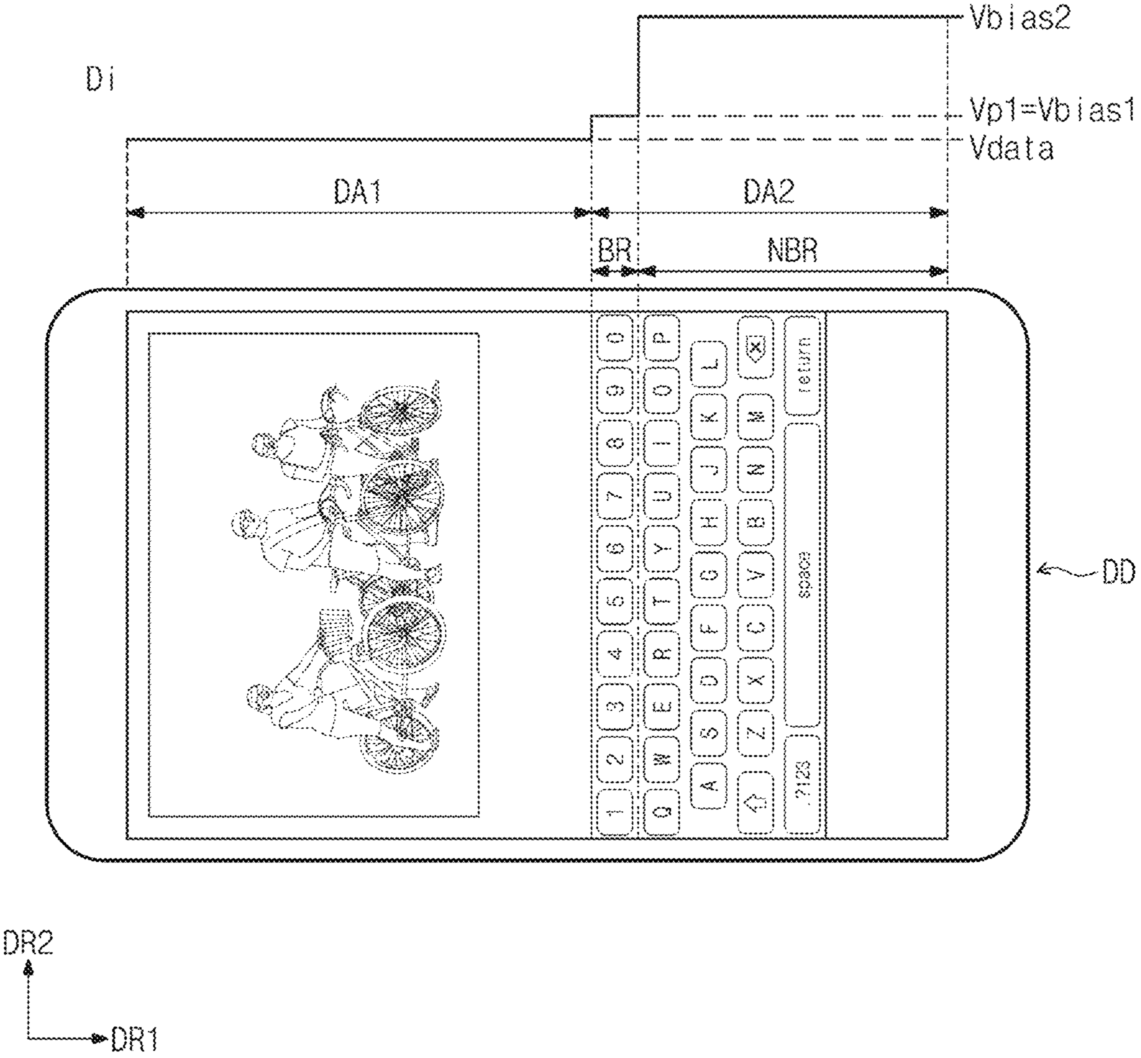
FIGS. 14A, 14B, and 14C illustrate a data signal provided to an i-th data line during a non-driving period of a multi-frequency mode.
Figure 14B:
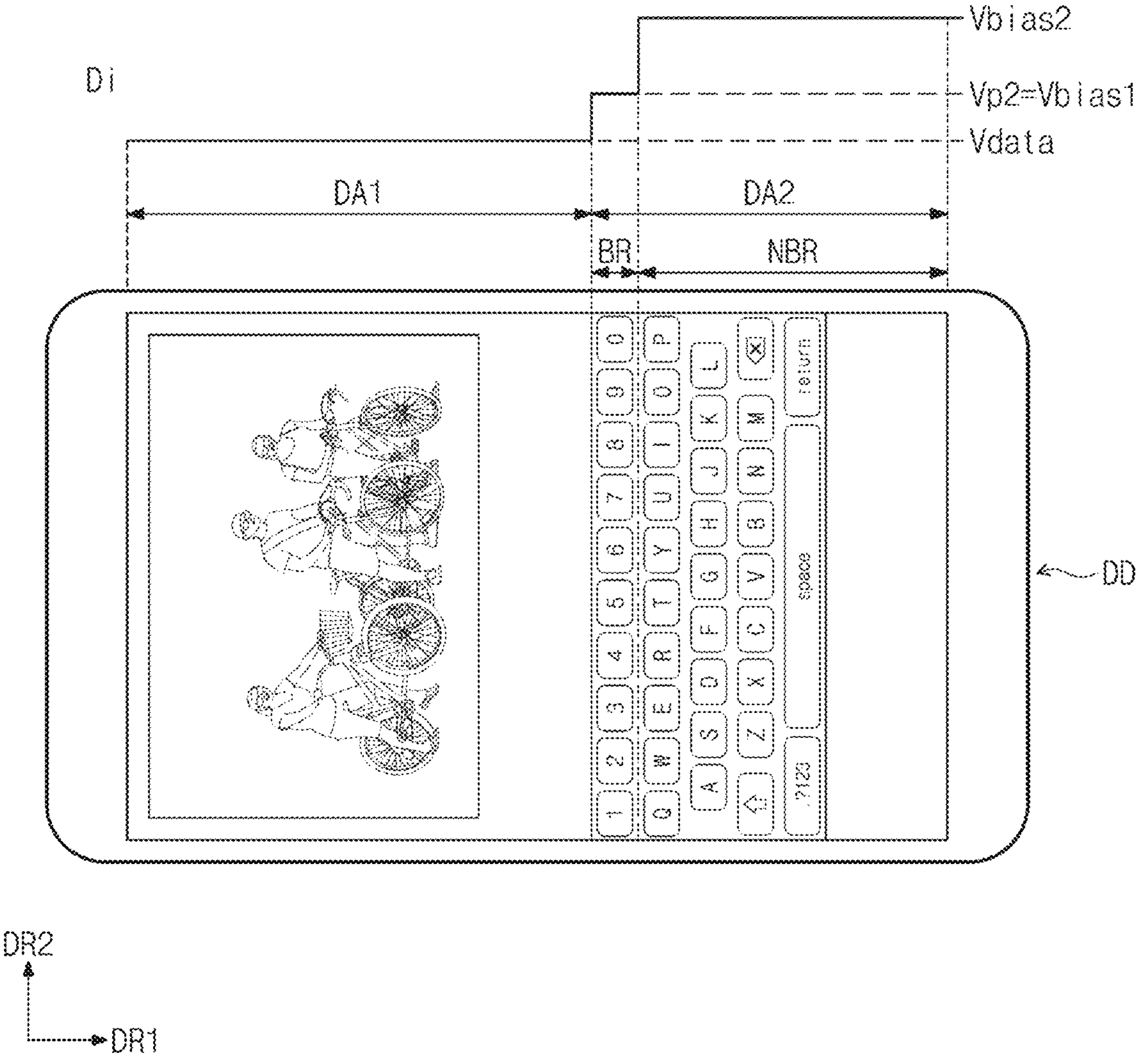
Figure 14C:
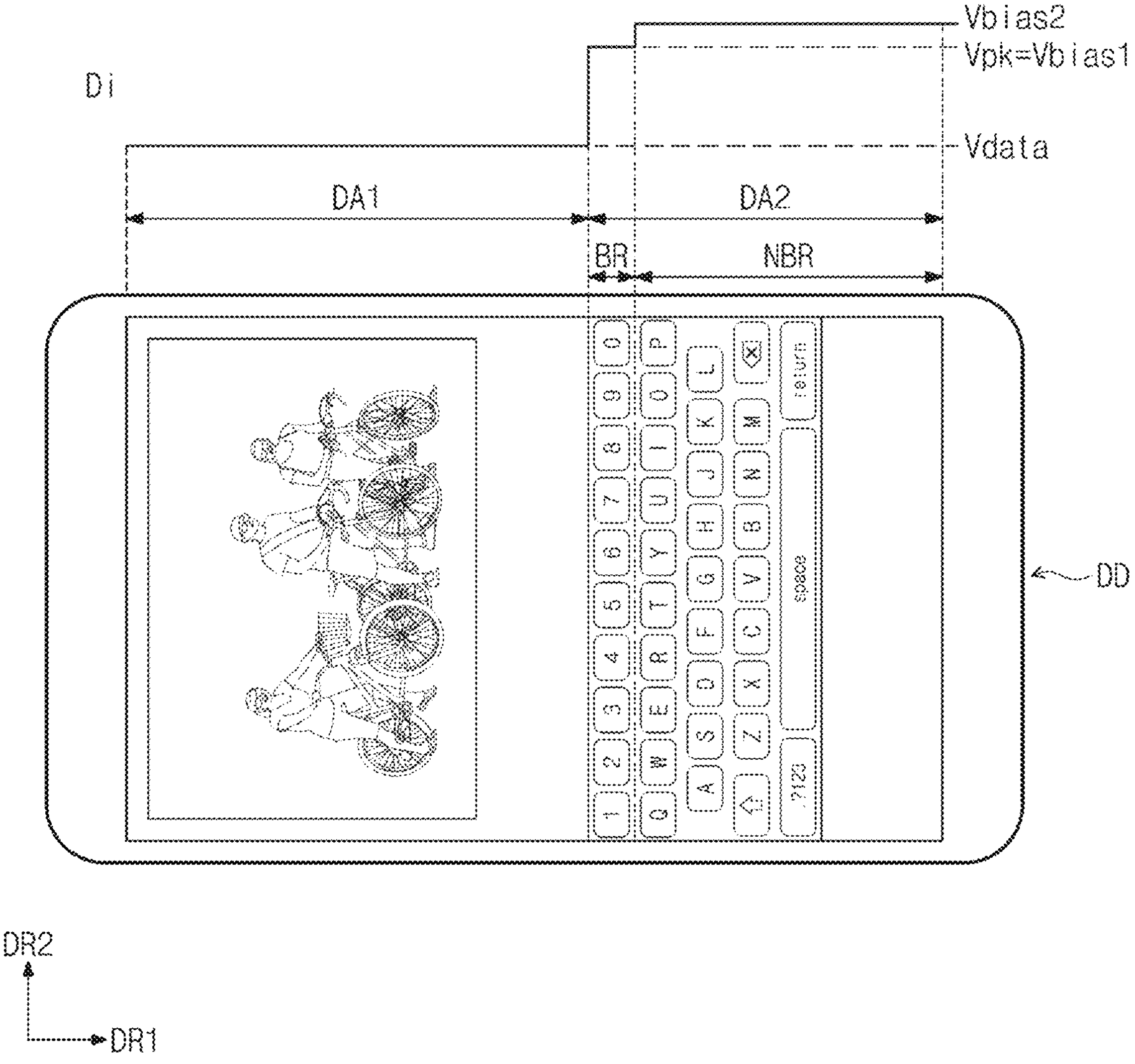

FIGS. 14A, 14B, and 14C illustrate the data signal Di provided to the i-th data line DLi during the non-driving period NDRP of the multi-frequency mode MFM.

Referring to FIGS. 14A, 14B, and 14C, because the first display area DA1 is driven at the first driving frequency in the multi-frequency mode MFM, the data signal Di that is provided to the i-th data line DLi while the first display area DA1 is driven has the voltage level Vdata corresponding to the output image signal DATA.

In the non-driving period NDRP (refer to FIG. 7) of the multi-frequency mode MFM, the data signal Di that is provided to the i-th data line DLi while the boundary area BR is driven may have the first voltage level Vbias1 corresponding to the first bias signal BIAS1.

The first voltage level Vbias1 may change in units of a given number of frames. In an embodiment, for example, the first voltage level Vbias1 may be Vp1 during the second frame F2 (refer to FIG. 7) belonging to the non-driving period NDRP, may be Vp2 during the third frame F3 (refer to FIG. 7) belonging to the non-driving period NDRP, and may be Vpk during the k-th frame Fk (k is a natural number greater than 1 and less than or equal to 120) belonging to the non-driving period NDRP.

In an embodiment, for example, when k is 10, the first voltage level Vbias1 may change for each frame to sequentially have Vp1, Vp2, Vp3, Vp4, Vp5, Vp6, Vp7, Vp8, Vp9, Vp10, Vp1, Vp2 . . . .

In such an embodiment, voltage levels of data signals that are provided to pixels of all horizontal lines in the boundary area BR may be the same as the first voltage level Vbias1.

In the pixels PX disposed in the boundary area BR, as a voltage level of a bias signal provided to the first electrode of the first transistor T1 (refer to FIG. 5) changes periodically, for example, every frame, the afterimage phenomenon in the boundary area BR may decrease. Even though a luminance difference of the first display area DA1 and the second display area DA2 due to the afterimage occurs, the afterimage phenomenon may decrease in the boundary area BR, and thus, the degree to which the user perceives the luminance difference may be minimized.

In an embodiment, a change period of the first voltage level Vbias1 may be variously modified. In an embodiment, for example, the first voltage level Vbias1 may change in units of two frames. In such an embodiment, the first voltage level Vbias1 may change for each frame to sequentially and repeatedly have Vp1, Vp1, Vp2, Vp2, Vp3, Vp3, Vp4, Vp4, Vp5, Vp5, Vp6, and Vp6.

In the non-driving period NDRP of the multi-frequency mode MFM, the data signal Di that is provided to the i-th data line DLi while the non-boundary area NBR is driven may have the second voltage level Vbias2 corresponding to the second bias signal BIAS2. In an embodiment, the first voltage level Vbias1 may be lower than the second voltage level Vbias2.

Figure 15:
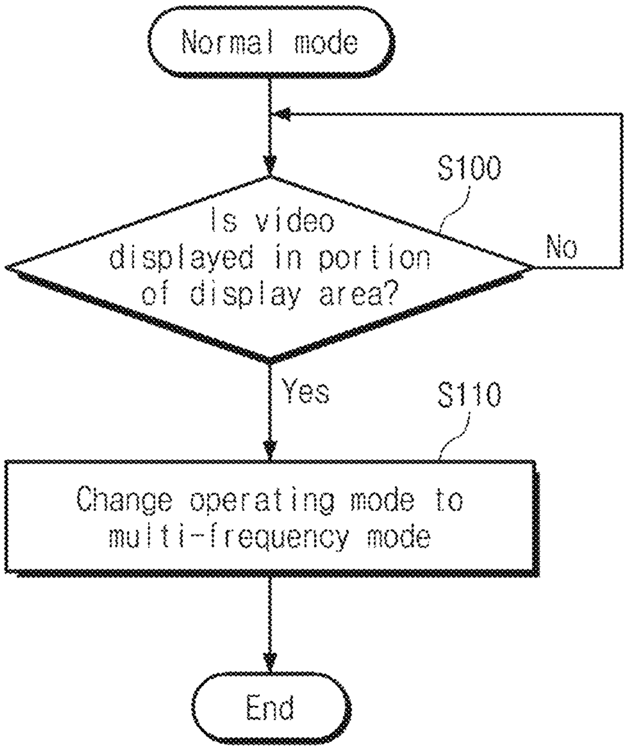
FIG. 15 is a flowchart illustrating an operation of a driving controller according to an embodiment of the disclosure.

FIG. 15 is a flowchart illustrating an operation of a driving controller according to an embodiment of the disclosure.

Referring to FIGS. 9 and 15, initially (e.g., after power-up), the operating mode of the operating mode determiner 110 of the driving controller 100 may be set to the normal frequency mode.

The operating mode determiner 110 determines the frequency mode in response to the input image signal RGB and the control signal CTRL. In an embodiment, for example, in one frame, when a part (e.g., an image signal corresponding to the first display area DA1 (refer to FIG. 1)) of the input image signal RGB is a video and the remaining part (e.g., an image signal corresponding to the second display area DA2 (refer to FIG. 1)) of the image signal is a still image (in operation S100), the operating mode determiner 110 changes the operating mode to the multi-frequency mode and outputs the mode signal MD corresponding to the determined frequency mode (in operation S110). The mode signal MD may include information about the first driving frequency of the first display area DA1 and the second driving frequency of the second display area DA2, in addition to information indicating whether the operating mode is the normal frequency mode or the multi-frequency mode. Also, the mode signal MD may include information about a start location and/or a boundary area of the second display area DA2.

Figure 16:
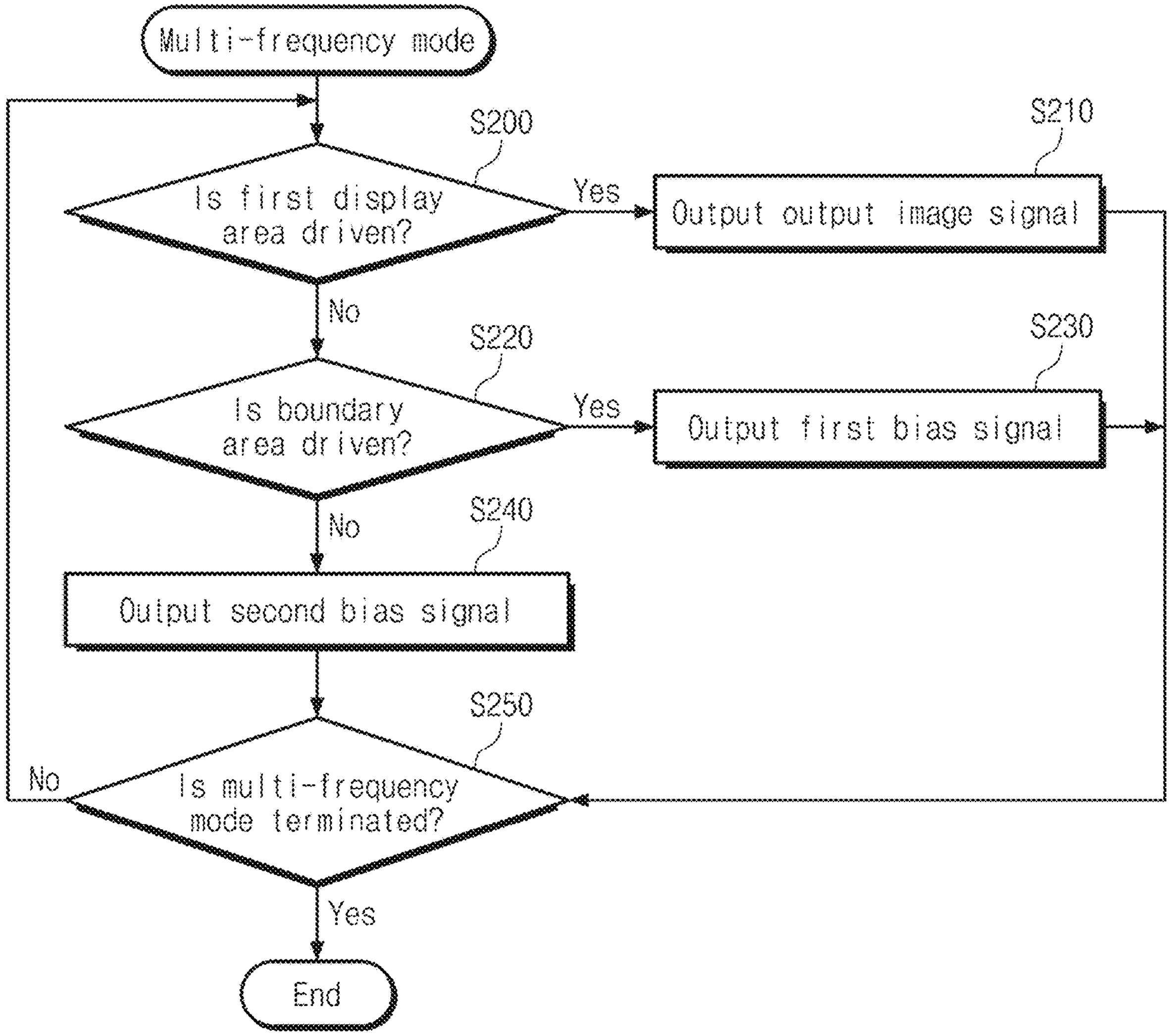
FIG. 16 is a flowchart illustrating an operation of a driving controller in a multi-frequency mode according to an embodiment of the disclosure.

FIG. 16 is a flowchart illustrating an operation of a driving controller in a multi-frequency mode according to an embodiment of the disclosure.

Referring to FIGS. 9, 10, and 16, during the multi-frequency mode, the first display area DA1 may be driven at the first driving frequency, and the second display area DA2 may be driven at the second driving frequency lower than the first driving frequency.

While the mode signal MD indicates the multi-frequency mode, the signal generator 120 of the driving controller 100 may sequentially output the output image signal DATA, the first bias signal BIAS1, and the second bias signal BIAS2.

When the first display area DA1 is driven (in operation S200), the signal generator 120 outputs the output image signal DATA corresponding to the input image signal RGB (in operation S210).

When the boundary area BR is driven (in operation S220), the signal generator 120 outputs the first bias signal BIAS1 (in operation S230).

When the non-boundary area NBR is driven (in operation S220), the signal generator 120 outputs the second bias signal BIAS2 (in operation S240).

When the input image signal RGB of the whole frame corresponds to a video, the operating mode determiner 110 changes the frequency mode to the normal frequency mode and outputs the mode signal MD corresponding to the determined frequency mode (in operation S250).

In embodiments of the disclosure, when a video is displayed in a first display area and a still image is displayed in a second display area, a display device may operate in a multi-frequency mode in which the first display area is driven at a first driving frequency and the second display area is driven at a second driving frequency. In the multi-frequency mode, a given bias voltage may be provided to data lines of a boundary of the second display area, which is adjacent to the first display area. In such an embodiment, the reduction of a display quality may be effectively prevented by setting a voltage level of the bias voltage in a way such that a luminance difference due to an afterimage is not visually perceived at the boundary.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel including first pixels disposed in a first display area and second pixels disposed in a second display area;

a driving controller which receives an input image signal and outputs an output image signal; and a data driving circuit which provides a data signal to each of the first pixels and the second pixels in response to the output image signal, wherein the second display area includes a boundary area adjacent to the first display area and a non-boundary area adjacent to the boundary area, and wherein the driving controller outputs the output image signal corresponding to the input image signal when the first display area is driven, the driving controller outputs the output image signal corresponding to a first bias signal when the boundary area is driven, and the driving controller outputs the output image signal corresponding to a second bias signal different from the first bias signal when the non-boundary area is driven.

2. The display device of claim 1, wherein the boundary area includes H horizontal lines from a first horizontal line to an H-the horizontal line sequentially arranged from a location adjacent to the first display area, wherein H is a natural number, and wherein the driving controller outputs the first bias signal having a voltage level which varies from the first horizontal line to the H-th horizontal line.

3. The display device of claim 2, wherein the voltage level of the first bias signal stepwise increases from the first horizontal line to the H-th horizontal line.

4. The display device of claim 1, wherein a voltage level of the first bias signal is higher than a reference voltage and is lower than a voltage level of the second bias signal.

5. The display device of claim 1, wherein, in a first frame belonging to a non-driving period of a multi-frequency mode, the first bias signal has a first voltage level, and wherein, in a second frame belonging to the non-driving period, the first bias signal has a second voltage level different from the first voltage level.

6. The display device of claim 5, wherein the first voltage level and the second voltage level are higher than a reference voltage and is lower than a voltage level of the second bias signal.

7. The display device of claim 1, further comprising:

a scan driving circuit which drives first scan lines and second scan lines, and wherein each of the first pixels and the second pixels is connected with a corresponding one of the first scan lines and a corresponding one of the second scan lines.

8. The display device of claim 7, wherein, in a multi-frequency mode, the driving controller controls the data driving circuit and the scan driving circuit in a way such that the first pixels are driven at a first driving frequency and the second pixels are driven at a second driving frequency lower than the first driving frequency.

9. The display device of claim 8, wherein, during a non-driving period of the multi-frequency mode, some first scan lines connected with the second pixels from among the first scan lines receive scan signals having a disable level, respectively.

10. The display device of claim 1, wherein the driving controller includes:

an operating mode determiner which determines an operating mode based on the input image signal and a controls signal and outputs a mode signal; and a signal generator which outputs the output image signal corresponding to one of the input image signal, the first bias signal, and the second bias signal in response to the input image signal, the control signal, and the mode signal.

11. A display device comprising:

a display panel including first pixels disposed in a first display area and second pixels disposed in a second display area;

a driving controller which receives an input image signal and outputs an output image signal; and a data driving circuit which provides a data signal to each of the first pixels and the second pixels in response to the output image signal, wherein the second display area includes a boundary area adjacent to the first display area and a non-boundary area adjacent to the boundary area, and wherein, in a multi-frequency mode, a second pixel belonging to the boundary area from among the second pixels receives the data signal corresponding to a first bias signal during a non-driving period of the second display area, and wherein a second pixel belonging to the non-boundary area from among the second pixels receives the data signal corresponding to a second bias signal different from the first bias signal during the non-driving period.

12. The display device of claim 11, wherein the boundary area includes H horizontal lines from a first horizontal line to an H-th horizontal line sequentially arranged from a location adjacent to the first display area, wherein H is a natural number, and wherein a voltage level of the data signal varies from a second pixel disposed at the first horizontal line from among the second pixels to a second pixel disposed at the H-th horizontal line from among the second pixels.

13. The display device of claim 11, wherein a voltage level of the data signal corresponding to the first bias signal is higher than a reference voltage and is lower than a voltage level of the data signal corresponding to the second bias signal.

14. The display device of claim 11, wherein, in a first frame belonging to the non-driving period of the multi-frequency mode, the data signal corresponding to the first bias signal has a first voltage level, and wherein, in a second frame belonging to the non-driving period, the data signal corresponding to the first bias signal has a second voltage level different from the first voltage level.

15. The display device of claim 14, wherein the first voltage level and the second voltage level are higher than a reference voltage and is lower than a voltage level of the data signal corresponding to the second bias signal.

16. The display device of claim 11, further comprising:

a scan driving circuit which drives first scan lines and second scan lines, and wherein each of the first pixels and the second pixels is connected with a corresponding one of the first scan lines and a corresponding one of the second scan lines.

17. The display device of claim 16, wherein, in the multi-frequency mode, the driving controller controls the data driving circuit and the scan driving circuit in a way such that the first pixels are driven at a first driving frequency and the second pixels are driven at a second driving frequency lower than the first driving frequency.

18. The display device of claim 17, wherein, during the non-driving period of the multi-frequency mode, some first scan lines connected with the second pixels from among the first scan lines receive scan signals having a disable level, respectively.

19. A driving method of a display device, the method comprising:

dividing a display panel into a first display area and a second display area in a multi-frequency mode in a way such that the first display area is driven at a first driving frequency and the second display area is driven at a second driving frequency;

outputting an output image signal corresponding to an input image signal when the first display area is driven;

outputting the output image signal corresponding to a first bias signal when a boundary area of the second display area, which is adjacent to the first display area, is driven; and outputting the output image signal corresponding to a second bias signal different from the first bias signal when a non-boundary area of the second display area, which is adjacent to the boundary area, is driven.

20. The method of claim 19, wherein the boundary area includes H horizontal lines from a first horizontal line to an H-th horizontal line sequentially arranged from a location adjacent to the first display area, wherein H is a natural number, and wherein the outputting the output image signal corresponding to the first bias signal includes:

outputting the first bias signal having a voltage level which varies when the first horizontal line to the H-th horizontal line are sequentially driven.

* * * * *